(12) United States Patent
Na et al.

(10) Patent No.: US 10,503,315 B2
(45) Date of Patent: Dec. 10, 2019

(54) DISPLAY DEVICE

(71) Applicant: Samsung Display Co., Ltd., Yongin-si (KR)

(72) Inventors: Hyunjae Na, Seoul (KR); Gwang-bum Ko, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/272,264

(22) Filed: Feb. 11, 2019

(65) Prior Publication Data

US 2019/0171333 A1 Jun. 6, 2019

Related U.S. Application Data

(63) Continuation of application No. 15/192,939, filed on Jun. 24, 2016, now Pat. No. 10,234,982.

(30) Foreign Application Priority Data

Nov. 4, 2015 (KR) ........................ 10-2015-0154604

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
CPC ....... G06F 3/0412; G06F 3/0416; G06F 3/044
See application file for complete search history.

(56) References Cited

U.S. PATENT DOCUMENTS

| 8,319,747 B2 | 11/2012 | Hotelling et al. |
| 8,508,680 B2 | 8/2013 | Geaghan et al. |
| 2010/0144391 A1 | 6/2010 | Chang et al. |
| 2011/0048813 A1 | 3/2011 | Yilmaz |

(Continued)

FOREIGN PATENT DOCUMENTS

| CN | 103941936 | 7/2014 |
| EP | 2447812 | 5/2012 |

(Continued)

OTHER PUBLICATIONS

Examination Report dated Nov. 6, 2018, in European Patent Application No. 16184635.7.

(Continued)

*Primary Examiner* — Nelson M Rosario
(74) *Attorney, Agent, or Firm* — H.C. Park & Associates, PLC

(57) ABSTRACT

A display device includes a display panel and a touch sensing unit including touch signal lines (TSL) and sensor columns (SCs) including sensor blocks (SBs). Each SB includes a first sensor (FS) and i (i being $\geq 2$) second sensors (SSs). The TSLs include: first signal lines (FSLs) respectively connected to some of the FSs, a portion of each of the FSLs extending to a first end of a corresponding SC from a corresponding sensor of the some of the FSs; second signal lines (SSLs) respectively connected to other FSs, a portion of each of the SSLs extending to a second end of the corresponding SC from a corresponding sensor of the other FSs; and third signal lines connecting a j-th (j being $\leq 1$) SS of an n-th (n being $\geq 1$) SB to an (i−j+1)-th SS of an (n+1)-th SB.

13 Claims, 28 Drawing Sheets

(56) References Cited

U.S. PATENT DOCUMENTS

| | | |
|---|---|---|
| 2013/0021289 A1 | 1/2013 | Chen et al. |
| 2013/0181942 A1 | 7/2013 | Bulea et al. |
| 2014/0202840 A1 | 7/2014 | Fix et al. |
| 2014/0210784 A1 | 7/2014 | Gourevitch et al. |
| 2015/0193047 A1 | 7/2015 | Hoshtanar et al. |
| 2015/0220204 A1 | 8/2015 | Noguchi et al. |
| 2015/0261348 A1 | 9/2015 | Jang et al. |
| 2016/0004343 A1 | 1/2016 | Gourevitch et al. |

FOREIGN PATENT DOCUMENTS

| | | |
|---|---|---|
| EP | 2595034 | 5/2013 |
| KR | 10-1233594 | 1/2011 |
| KR | 10-2011-0127236 | 11/2011 |
| KR | 10-2013-0067869 | 6/2013 |
| KR | 10-1294341 | 7/2013 |
| KR | 10-1293165 | 8/2013 |
| KR | 10-1397200 | 5/2014 |
| KR | 10-2015-0108003 | 9/2015 |
| WO | 2014123671 | 8/2014 |
| WO | 2015038282 | 3/2015 |

OTHER PUBLICATIONS

Extended European Search Report dated Mar. 8, 2017, in European Patent Application No. 16184635.7.
Non-Final Office Action dated Feb. 8, 2018, in U.S. Appl. No. 15/192,939.
Final Office Action dated Jun. 29, 2018, in U.S. Appl. No. 15/192,939.
Notice of Allowance dated Oct. 29, 2018, in U.S. Appl. No. 15/192,939.

DISPLAY DEVICE

CROSS-REFERENCE TO RELATED APPLICATIONS

This application is a Continuation of U.S. patent application Ser. No. 15/192,939, filed Jun. 24, 2016, and claims priority from and the benefit of Korean Patent Application No. 10-2015-0154604, filed Nov. 4, 2015, each of which is hereby incorporated by reference for all purposes as if fully set forth herein.

BACKGROUND

Field

Exemplary embodiments relate to a display device, and, more particularly, to a display device including a touch sensing unit.

Discussion

Various display devices are used in association with multimedia devices, such as televisions, mobile phones, tablet computers, navigational equipment, game consoles, etc. These multimedia devices may include an input device to facilitate user interaction, such as keyboards, mice, etc. Additionally, display devices may include touch sensing units as input devices.

The above information disclosed in this Background section is only for enhancement of understanding of the background of the inventive concept, and, therefore, it may contain information that does not form the prior art that is already known to a person of ordinary skill in the art.

SUMMARY

One or more exemplary embodiments provide a display device including a touch sensing unit with improved sensitivity.

Additional aspects will be set forth in the detailed description which follows, and, in part, will be apparent from the disclosure, or may be learned by practice of the inventive concept.

According to one or more exemplary embodiments, a display device includes a display panel configured to generate an image; and a touch sensing unit disposed on the display panel, the touch sensing unit including touch signal lines and sensor columns including sensor blocks. Each of the sensor blocks includes: a first sensor; and i (i being a natural number greater than or equal to two) second sensors arranged in a first direction. The touch signal lines include: first signal lines respectively connected to some of the first sensors, a portion of each of the first signal lines extending to a first end of a corresponding sensor column of the sensor columns from a corresponding sensor of the some of the first sensors; second signal lines respectively connected to other first sensors of the first sensors, a portion of each of the second signal lines extending to a second end of the corresponding sensor column of the sensor columns from a corresponding sensor of the other first sensors; and third signal lines connecting a j-th (j being a natural number less than or equal to one) second sensor of the i second sensors of an n-th (n being a natural number greater than or equal to one) sensor block of the sensor blocks to an (i−j+1)-th second sensor of the i second sensors of an (n+1)-th sensor block of the sensor blocks.

According to one or more exemplary embodiments, a display device includes a display panel configured to generate an image; and a touch sensing unit disposed on the display panel, the touch sensing unit including touch signal lines and sensor columns. Each of the sensor columns includes sensor blocks arranged in a first direction. Each of the sensor blocks includes: a first sensor; and i (i being a natural number greater than or equal to two) second sensors adjacent to the first sensor, the i second sensors being arranged in the first direction. The touch signal lines include: first signal lines connected to the first sensors of the sensor blocks; and second signal lines connecting a j-th (j being a natural number greater than or equal to one and less than or equal to i) second sensor of the i second sensors of an n-th (n being a natural number greater than or equal to one) sensor block of the sensor blocks to an (i−j+1)-th second sensor of the i second sensors of an (n+1)-th sensor block of the sensor blocks. The first sensor of the (n+1)-th sensor block includes: a first sensor portion; and a second sensor portion spaced apart from the first sensor portion in a second direction crossing the first direction. A first signal line of the first signal lines that is connected to the first sensor of the n-th sensor block is disposed between the first sensor portion and the second sensor portion.

According to one or more exemplary embodiments, an external input may be sensed using a touch sensing unit having a single-layer structure. Furthermore, a single-touch and a multi-touch may be distinguished from each other. Since the second sensors corresponding to different sensor blocks from each other are electrically connected to each other through a signal line, the number of the signal lines disposed on the touch sensing unit may be reduced. In this manner, a potential for short-circuits between the signal lines may be reduced. Moreover, noise caused, at least in part, by the signal lines may be reduced, which may improve touch sensitivity.

According to one or more exemplary embodiments, among the signal lines connected to the first sensors, a portion of the signal lines and another portion of the signal lines extend in different directions from each other such that the number of signal lines disposed between the first sensor and the second sensors may be reduced. In this manner, noise exerting influence on capacitance formed between the first sensor and the second sensors may be reduced.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
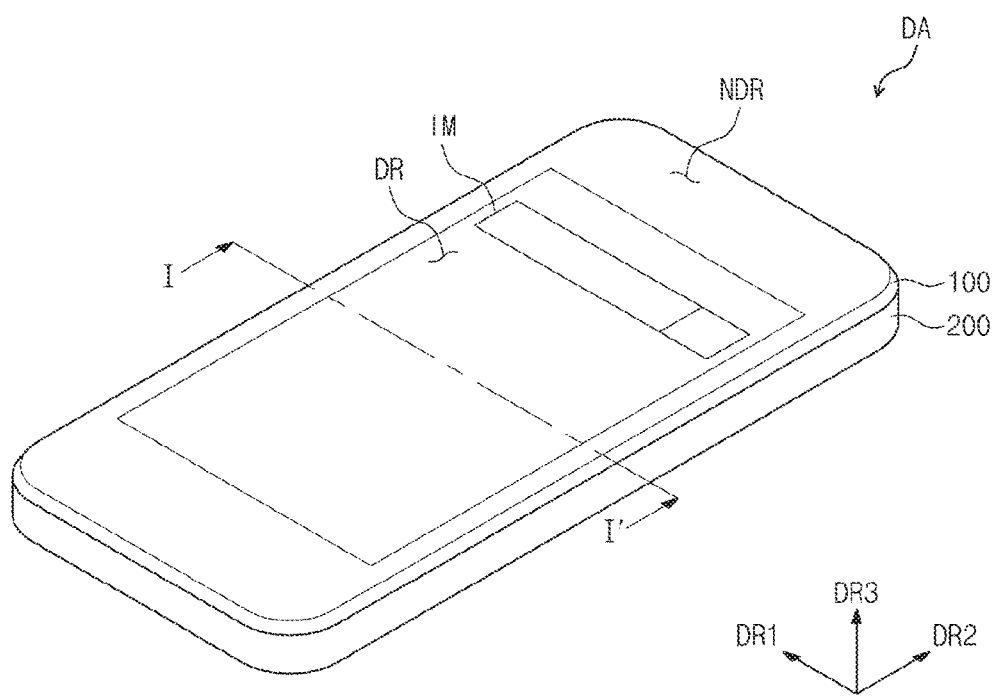
FIG. 1 is a perspective view of a display device, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Further, the DR1-axis, the DR2-axis, and the DR3-axis are not limited to three axes of a rectangular coordinate system, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Moreover, although a layer (or other feature) may be illustrated as "flat," the layer may not necessarily be required to be flat. To this end, a step difference may occur on a relatively upper layer due to a surface shape of a relatively lower layer during, for instance, a stacking process. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
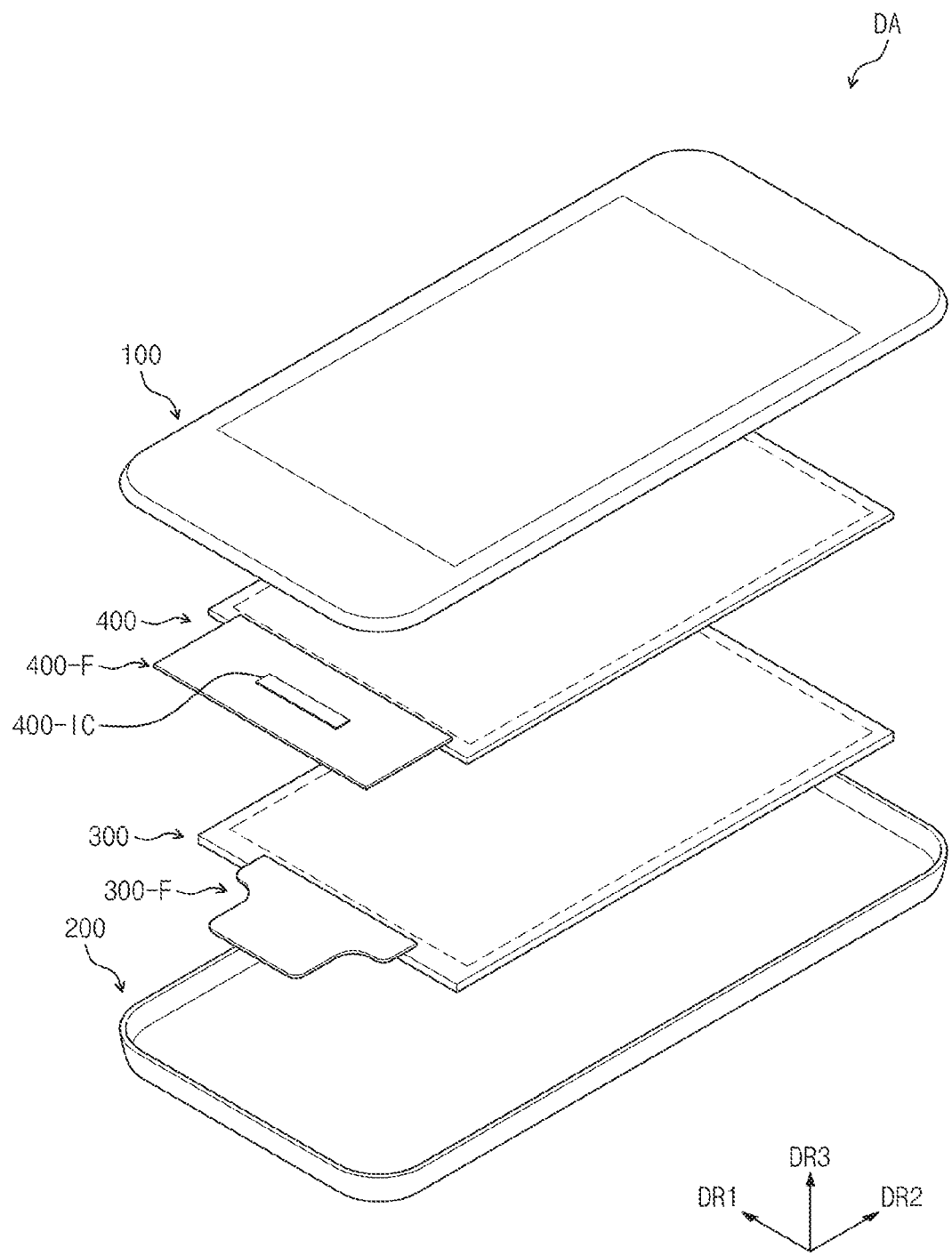
FIG. 2 is an exploded perspective view of the display device of FIG. 1, according to one or more exemplary embodiments.
Figure 3:
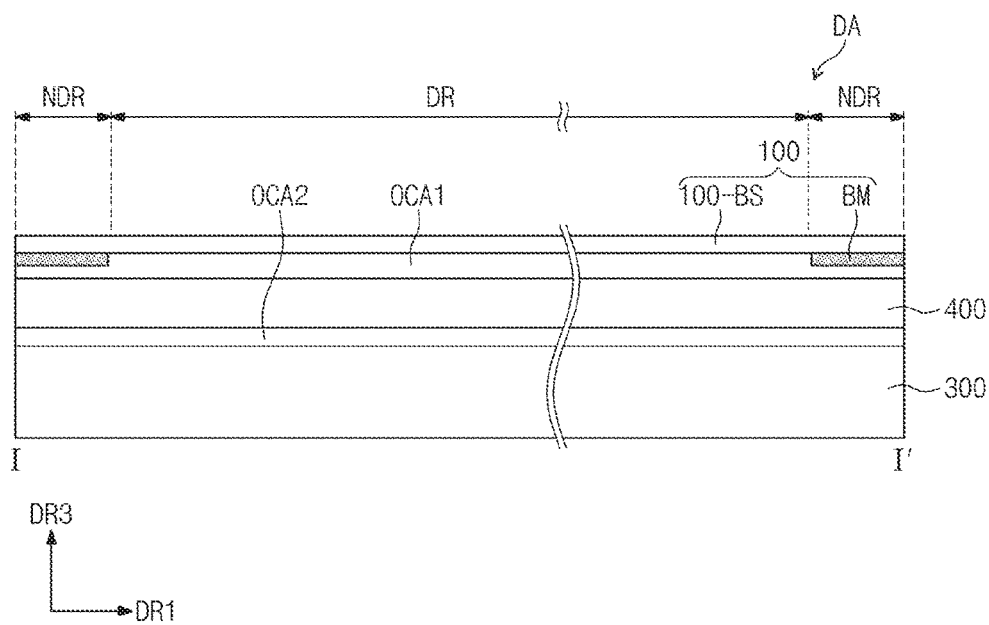
FIG. 3 is a cross-sectional view of the display device of FIG. 1 taken along sectional line I-I', according to one or more exemplary embodiments.

FIG. 1 is a perspective view of a display device, according to one or more exemplary embodiments. FIG. 2 is an exploded perspective view of the display device of FIG. 1, according to one or more exemplary embodiments. FIG. 3 is a cross-sectional view of the display device of FIG. 1 taken along sectional line I-I', according to one or more exemplary embodiments. As will become more apparent below, a protective frame 200 of the display device DA of FIG. 1 is not shown in FIG. 3.

A display surface configured to display an image IM is parallel (or substantially parallel) to a surface defined by a first direction DR1 and a second direction DR2. A third direction DR3 indicates a normal direction of the display surface. The third direction DR3 indicates a thickness direction of the display device DA. Front and rear surfaces of each member of the display device DA are distinguished by (or otherwise spaced apart from one another in) the third direction DR3. It is noted, however, that the directions indicated by the first, second, and third directions DR1, DR2, and DR3 are relative and may be converted into other directions.

Although FIG. 1 illustrates a "flat" display device DA as a representative example, it is contemplated that exemplary embodiments are not be limited thereto. For instance, the display device DA may be a curved display device with a determined curvature, a rollable display device, a foldable display device, a flexible display device, etc. Although not shown separately, the display device DA may be used in or in association with small and medium-sized electronic devices, such as mobile phones, personal computers, notebook computers, tablets, personal digital terminals, vehicle navigation units, game consoles, portable electronic devices, wristwatch-type electronic devices, refrigerators, washers, dryers, etc., in addition to large-sized electronic devices, such as televisions, monitors, outdoor billboards, etc.

Referring to FIG. 1, the display device DA includes a plurality of areas distinct from each other on the display surface. For instance, the display device DA includes a display area DR in which the image IM is displayed, and a non-display area NDR adjacent to the display area DR. FIG. 1 illustrates an internet search window as a representative example of the image IM, but exemplary embodiments are not limited thereto. As an example, the display area DR may have a quadrangular shape, but any other suitable geometric configuration may be utilized in association with exemplary embodiments described herein. The non-display area NDR may surround the display area DR. According to one or more exemplary embodiments, the non-display area NDR may be disposed only in areas adjacent to the display area DR in the first direction DR1 or the second direction DR2, in which the areas face each other and the display area DR is disposed therebetween. According to one or more exemplary embodiments, the non-display area NDR may be omitted.

As shown in FIGS. 2 and 3, the display device DA includes a window member 100, a protective frame 200, a display panel 300, and a touch sensing unit 400. The display device DA includes a first circuit board 300-F and a second circuit board 400-F that are respectively connected to the display panel 300 and the touch sensing unit 400. At least one of the first and second circuit boards 300-F and 400-F may be, but is not limited to, a flexible circuit board. The second circuit board 400-F may include a driving circuit 400-IC mounted thereon. The driving circuit 400-IC may drive the touch sensing unit 400 and may be, but is not limited to, a driver integrated circuit (IC). Although not shown, a driving circuit, e.g., a driver IC, may be mounted on the first circuit board 300-F to drive the display panel 300.

Each of the window member 100, the display panel 300, and the touch sensing unit 400 includes areas corresponding to the display area DR and the non-display area NDR of the display device DA when viewed in a plan view. In FIG. 3, widths in the first direction DR1 of the window member 100, the display panel 300, and the touch sensing unit 400 are same each other, but the widths of the window member 100, the display panel 300, and the touch sensing unit 400 may be selectively changed.

The window member 100 includes a base member 100-BS and a black matrix BM. The black matrix BM is disposed on a rear surface of the base member 100-BS to define the non-display area NDR. The base member 100-BS includes a glass substrate, a sapphire substrate, a plastic film, or the like. The black matrix BM may be formed via a coating manner using a colored organic layer. Although not shown in figures, the window member 100 may further include a functional coating layer disposed on a front surface of the base member 100-BS. The functional coating layer may include an anti-fingerprint layer, an anti-glare layer, and a hard coating layer.

The protective frame 200 is coupled to the window member 100 to accommodate the display panel 300 and the touch sensing unit 400. The protective frame 200 may be formed by assembling a number of parts or may be integrally formed in a single unitary and individual unit, which may be formed via an injection, compression, extrusion, etc., molding process(es). The protective frame 200 may include a plastic or metal material. According to one or more exemplary embodiments, the protective frame 200 may be omitted.

The display panel 300 generates the image IM corresponding to image data applied thereto. The display panel 300 may be a liquid crystal display panel, an organic light emitting display panel, or any other suitable display panel. For descriptive convenience, an organic light emitting display panel will be described as the display panel 300. The organic light emitting display panel will be described in more detail later.

The touch sensing unit 400 obtains coordinate information of a position at which a touch event occurs. The touch sensing unit 400 may be, but is not limited to, an electrostatic capacitive type touch sensing unit. The touch sensing unit 400 will be described in more detail later.

The window member 100 and the touch sensing unit 400 are coupled to each other by a first optically clear adhesive film OCA1 and the touch sensing unit 400 and the display panel 300 are coupled to each other by a second optically clear adhesive film OCA2. One of the two optically clear adhesive films OCA1 and OCA2 may be omitted. For instance, when the display panel 300 and the touch sensing unit 400 are manufactured through consecutive processes, the touch sensing unit 400 may be directly disposed on the display panel 300. In addition, the touch sensing unit 400 may be formed while the display panel 300 is manufactured, and, as such, the touch sensing unit 400 may be integrally formed with the display panel 300.

Figure 4:
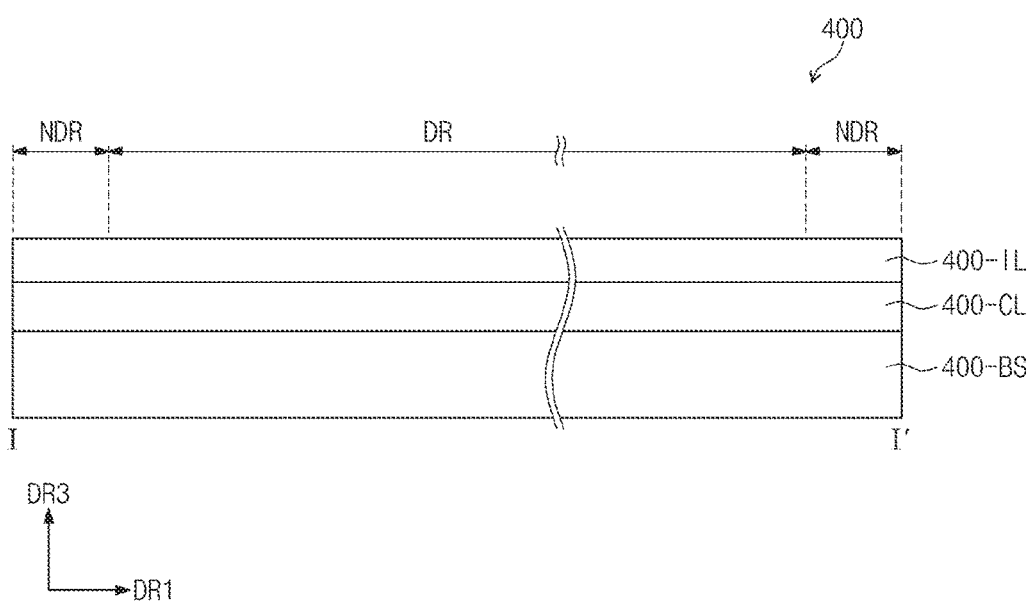
FIG. 4 is an enlarged cross-sectional view of a touch sensing unit, according to one or more exemplary embodiments.
Figure 5:
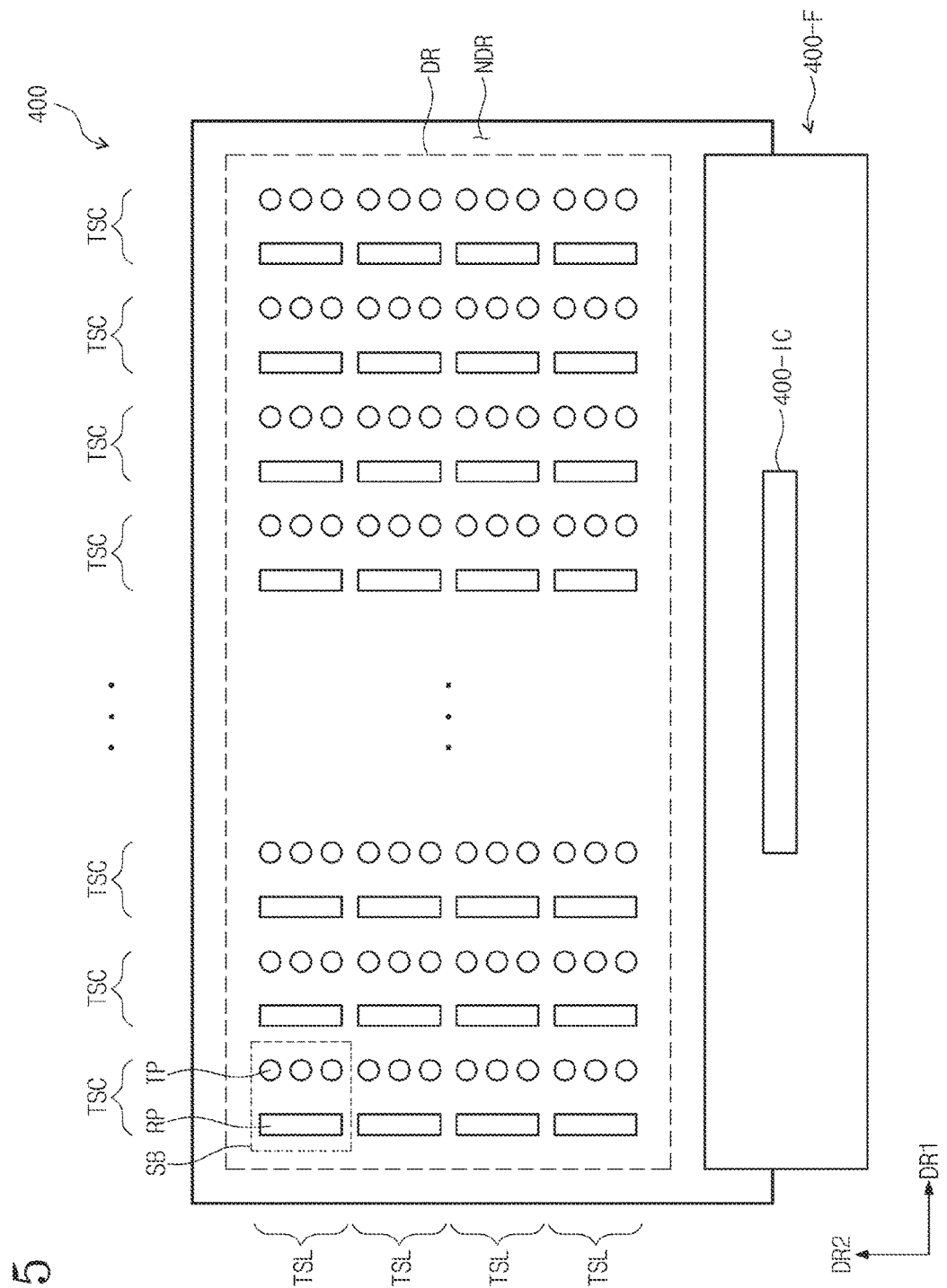
FIG. 5 is a plan view of the touch sensing unit of FIG. 4, according to one or more exemplary embodiments.
Figure 6:
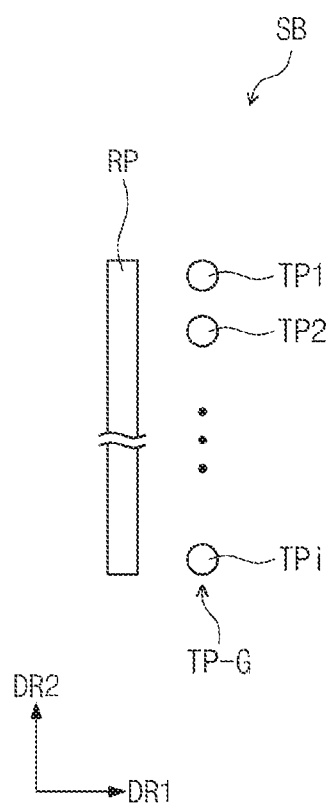
FIG. 6 is a plan view of a sensor block, according to one or more exemplary embodiments.
Figure 7A:
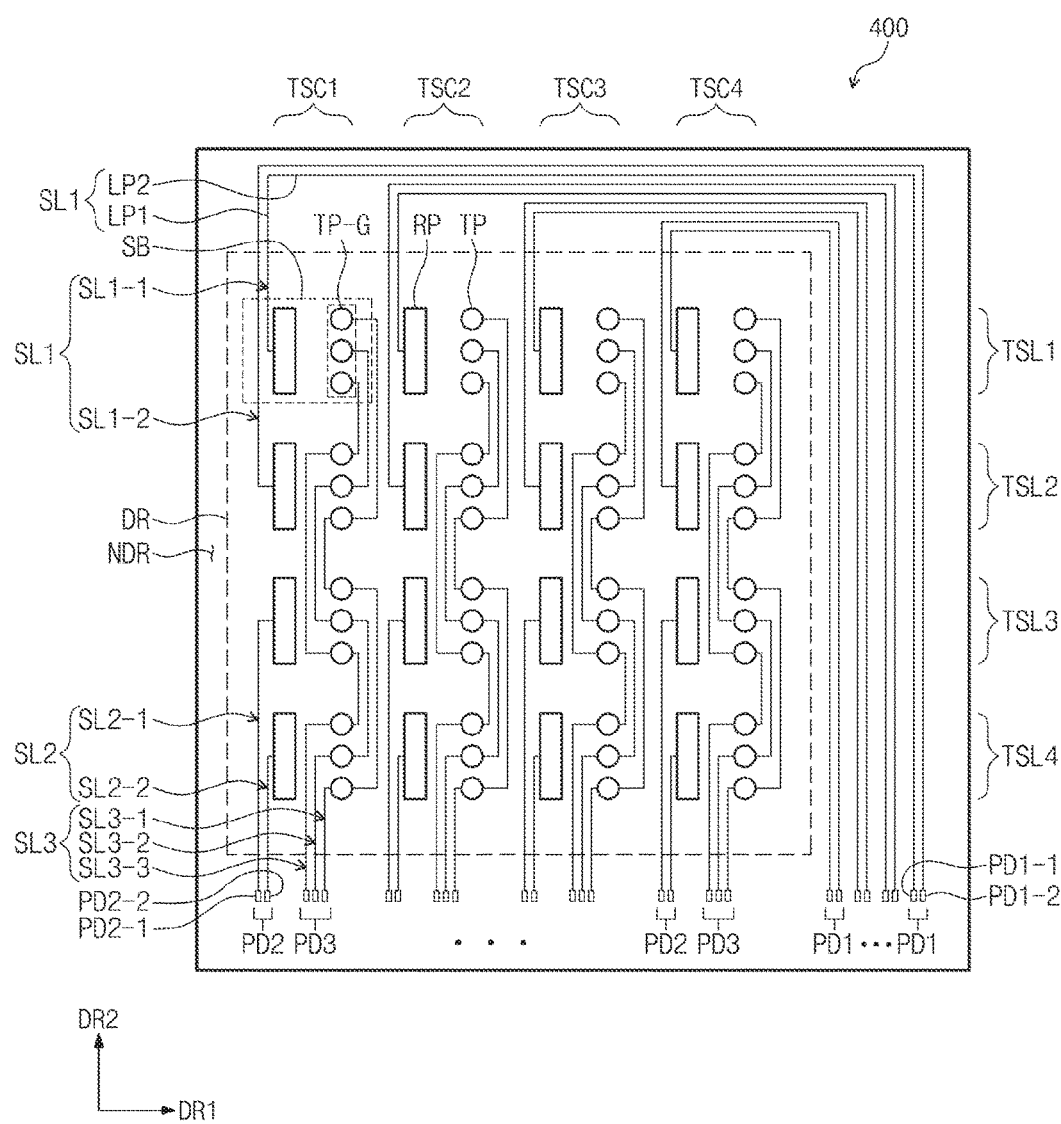
FIG. 7A is an enlarged plan view of a touch sensing unit, according to one or more exemplary embodiments.
Figure 7B:
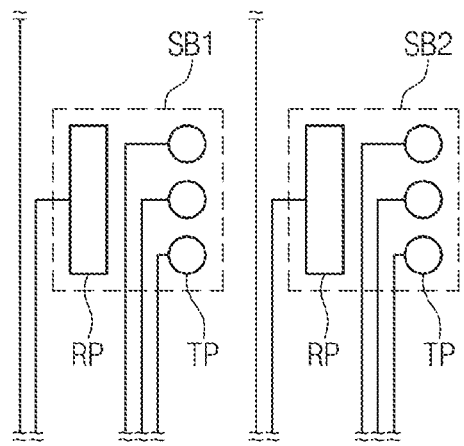
FIG. 7B is a plan view of two sensor blocks, according to one or more exemplary embodiments.
Figure 7C:
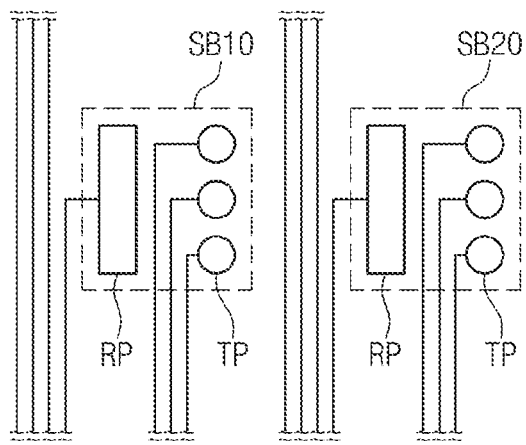
FIG. 7C is a plan view of two sensor blocks, according to a comparative example.

FIG. 4 is an enlarged cross-sectional view of a touch sensing unit, according to one or more exemplary embodiments. FIG. 5 is a plan view of the touch sensing unit of FIG. 4, according to one or more exemplary embodiments. FIG. 6 is a plan view of a sensor block, according to one or more exemplary embodiments. FIG. 7A is an enlarged plan view of a touch sensing unit, according to one or more exemplary embodiments. FIG. 7B is a plan view of two sensor blocks, according to one or more exemplary embodiments. FIG. 7C is a plan view of two sensor blocks, according to a comparative example. Hereinafter, the touch sensing unit 400 will be described in more detail with reference to FIGS. 4 to 6 and 7A to 7C.

Referring to FIG. 4, the touch sensing unit 400 includes a base member 400-BS, a conductive layer 400-CL, and an insulating layer 400-IL. According to one or more exemplary embodiments, the touch sensing unit 400 may be, but is not limited to, a single-layer electrostatic capacitive type touch sensing unit. The single-layer electrostatic capacitive type touch sensing unit obtains the coordinate information about the position, at which a touch (or near touch) event occurs, using a self-capacitance manner or a mutual capacitance manner. The touch sensing unit 400, however, should not be limited to a single-layer electrostatic capacitive type touch sensing unit. The touch sensing unit 400 may be, but is not limited to, a multi-layer electrostatic capacitive type touch sensing unit. In addition, the touch sensing unit 400 may have different layer structures depending on the display area DR and the non-display area NDR. According to one or more exemplary embodiments, the display area DR may have a single-layer structure and the non-display area NDR may have a multi-layer structure. For instance, only one conductive layer may be disposed in the display area DR, and a plurality of conductive layers may be alternately stacked with a plurality of insulating layers in the non-display area NDR.

The conductive layer 400-CL may include at least one of a transparent conductive layer and a metal layer. The transparent conductive layer may include indium tin oxide (ITO), indium zinc oxide (IZO), zinc oxide (ZnO), indium tin zinc oxide (ITZO), poly(3,4-ethylenedioxythiophene) (PEDOT), metal nanowire, or graphene. The metal layer may include molybdenum, silver, titanium, copper, aluminum, or an alloy thereof. According to one or more exemplary embodiments, the conductive layer 400-CL may include a plurality of transparent conductive layers or a plurality of conductive layers. The conductive layer 400-CL may include at least one transparent conductive layer and at least one metal layer. The conductive layer 400-CL may have a mesh structure. For instance, a plurality of mesh holes may be defined through the conductive layer 400-CL. According to one or more exemplary embodiments, the conductive layer 400-CL may include nanowires manufactured using at least one of the above-mentioned metal materials.

The conductive layer 400-CL may include a plurality of conductive patterns disposed on a surface of the base member 400-BS. The conductive patterns form touch sensors and touch signal lines of the touch sensing unit 400 as described below. The touch sensors and the touch signal lines may include the same material or different materials from each other. The insulating layer 400-IL protects the conductive patterns. The insulating layer 400-IL includes an inorganic layer and/or an organic layer. The insulating layer 400-IL may have a single-layer structure or a multi-layer structure.

As shown in FIG. 5, the touch sensing unit 400 includes sensor blocks SB disposed in the display area DR. The touch signal lines connected to the sensor blocks SB are not shown in FIG. 5. The sensor blocks SB define a plurality of sensor columns TSC and/or a plurality of sensor rows TSL. FIG. 5 shows the sensor blocks SB arranged in a matrix form, but arrangements should not be limited thereto or thereby. The sensor columns TSC may include different numbers of sensor blocks SB, and the sensor rows TSL may include different numbers of sensor blocks SB. The sensor columns TSC and/or the sensor rows TSL may be defined in a diagonal direction on the surface of the base member 400-BS. Each of the sensor blocks SB may include a first sensor RP and a plurality of second sensors TP. FIG. 5 shows the sensor blocks SB including one integrated-type first sensor RP and three second sensors TP as a representative example.

The second circuit board 400-F is connected to the non-display area NDR of the touch sensing unit 400. The second circuit board 400-F has a circuit configuration that may be changed according to the configuration of the touch sensing unit 400. Although not shown in detail, the touch sensing unit 400 and the second circuit board 400-F are electrically connected to each other by an anisotropic conductive film (ACF). According to one or more exemplary embodiments, the anisotropic conductive film may be replaced with a solder bump.

Hereinafter, the sensor block SB will be described in detail with reference to FIG. 6. The sensor block SB include the first sensor RP and i (i being a natural number greater than or equal to 2) second sensors TP1 to TPi disposed adjacent to the first sensor RP and arranged in a determined direction, e.g., the second direction DR2. The i second sensors TP1 to TPi form a sensor group TP-G. That is, i number of second sensors TP1 to TPi form a sensor group TP-G. The number of the first sensors RP included in the sensor block SB may be determined based on the number of the first sensors RP electrically insulated from each other. Although the sensor block SB includes two conductive patterns, two conductive patterns electrically connected to each other by a touch signal line are referred to as one sensor. This is equally applicable to the second sensor TP. That is, the i second sensors TP1 to TPi shown in FIG. 6 are electrically insulated from each other. The direction in which the second sensors TP are arranged is not limited to a specific direction and may be the same as a direction in which the first sensor RP extends. The second sensors TP may be arranged in the second direction DR2 as shown in FIGS. 5 and 6, or in a direction in which the sensor column TSC extends as shown in FIG. 5.

FIG. 7A shows four sensor columns TSC1 to TSC4 each including four sensor blocks SB. For descriptive and illustrative convenience, reference numerals are assigned to a first sensor column TSC1. Hereinafter, the reference number of the sensor columns TSC1 to TSC4 increases from a left column to a right column, the reference number of the sensor rows TSL1 to TSL4 increases from an upper row to a lower row, and the reference number of the sensors TP increases from an upper portion to a lower portion.

As shown in FIG. 7A, the touch signal lines include first signal lines SL1, second signal lines SL2, and third signal lines SL3. First pads PD1 are respectively connected to first end of the first signal lines SL1 and second pads PD2 are respectively connected to second ends of the second signal lines SL2. Third pads PD3 are respectively connected to second ends of the third signal lines SL3.

The first signal lines SL1 are respectively connected to the first sensors RP of a portion of the sensor blocks SB in the sensor column TSC, and the second signal lines SL2 are respectively connected to the first sensors RP of another portion of the sensor blocks SB in the same sensor column TSC. Among the first signal lines SL1, one first signal line SL1-1 is connected to the first sensor RP of the first sensor block SB and one first signal line SL1-2 is connected to the first sensor RP in a second sensor block SB. Among the second signal lines SL2, one second signal line SL2-1 is connected to the first sensor RP of a third sensor block SB and one second signal line SL2-2 is connected to the first sensor RP in a fourth sensor block SB.

At least a portion of each of the first signal lines SL1 extends in a first end (e.g., an upper end in FIG. 7A) of a corresponding sensor column TSC from a corresponding first sensor RP, and at least a portion of each of the second signal lines SL2 extends in a second end (e.g., a lower end in FIG. 7A) of a corresponding sensor column TSC from a corresponding first sensor RP. For instance, each of the first signal lines SL1 includes a first portion LP1 connected to the corresponding first sensor RP and extending in the first end of the correspond sensor column TSC and a second portion LP2 connecting the first portion LP1 and a corresponding first pad PD1. The first portion LP1 of each of the first signal lines SL1 extends in the direction of the sensor column TSC and is not overlapped with the second signal lines SL2 in the direction of the sensor row TSL. The second portion LP2 of each of the first signal lines SL1 is disposed in the non-display area NDR. In this manner, the second portion LP2 of each of the first signal lines SL1 is overlapped with the black matrix BM shown in FIG. 3. The second portion LP2 of each of the first signal lines SL1 has a bent shape.

The first pads PD1 and the second pads PD2 are disposed adjacent to the second ends of the sensor columns TSC. Since the first pads PD1 and the second pads PD2 are arranged in association with the same side of the non-display area NDR, a bonding process of the touch sensing unit 400 and the second circuit board 400-F may be simplified. The third pads PD3 may be arranged in association with the side of the non-display area NDR that the first and second pads PD1 and PD2 are disposed.

The third signal line SL3 connects a j-th (j being a natural number greater than or equal to 1 and less than or equal to i) second sensor TP among the i second sensors TPi of a n-th sensor block of the sensor blocks SB of each of the sensor columns TSC1 to TSC4 and an (i−j+1)-th second sensor among the i second sensors TPi of an (n+1)-th sensor block of the sensor blocks SB of each of the sensor columns TSC1 to TSC4. Hereinafter, three third signal lines SL3-1, SL3-2, and SL3-3 will be described in more detail.

One third signal line SL3-1 connects a first second sensor TP of a first sensor block SB, a third second sensor TP of a second sensor block SB, a first second sensor TP of a third sensor block SB, and a third second sensor TP of a fourth sensor block SB. Another third signal line SL3-2 connects second second sensors TP of the first to fourth sensor blocks SB. Yet another third signal line SL3-3 connects a third second sensor TP of the first sensor block SB, a first second sensor TP of the second sensor block SB, a third second sensor TP of the third sensor block SB, and a first second sensor TP of the fourth sensor block SB. The third signal lines SL3 connect the second sensors TP of the sensor columns TSC, and second ends thereof are connected to the third pad PD3.

The first sensors RP, the second sensors TP, the first signal lines SL1, the second signal lines SL2, the third signal lines SL3, the first pads PD1, the second pads PD2, and the third pads PD3 may be disposed on the same layer as one another. At least the first and second sensors RP and TP may be formed by patterning a conductive layer formed through the same process. At least the first, second, and third signal lines SL1, SL2, and SL3 may be formed by patterning a conductive layer formed through the same process. At least the first, second, and third pads PD1, PD2, and PD3 may be formed by patterning a conductive layer formed through the same process and formed by patterning a conductive layer formed through the same process as the first, second, and third signal lines SL1, SL2, and SL3.

FIGS. 7B and 7C show two sensor blocks SB adjacent to each other and disposed in the fourth sensor row TSL4. In FIG. 7B, two signal lines are disposed between sensor blocks SB1 and SB2, and four signal lines are disposed between sensor blocks SB10 and SB20 in FIG. 7C. The number of the signal lines SL disposed between the first sensor RP and the second sensors TP is reduced in the touch sensing unit according to one or more exemplary embodiments when compared with the touch sensing unit according to the comparative example. Accordingly, a noise exerting influence on electrostatic capacitance formed in association with the first sensor RP and the second sensors TP may be reduced.

Figure 8:
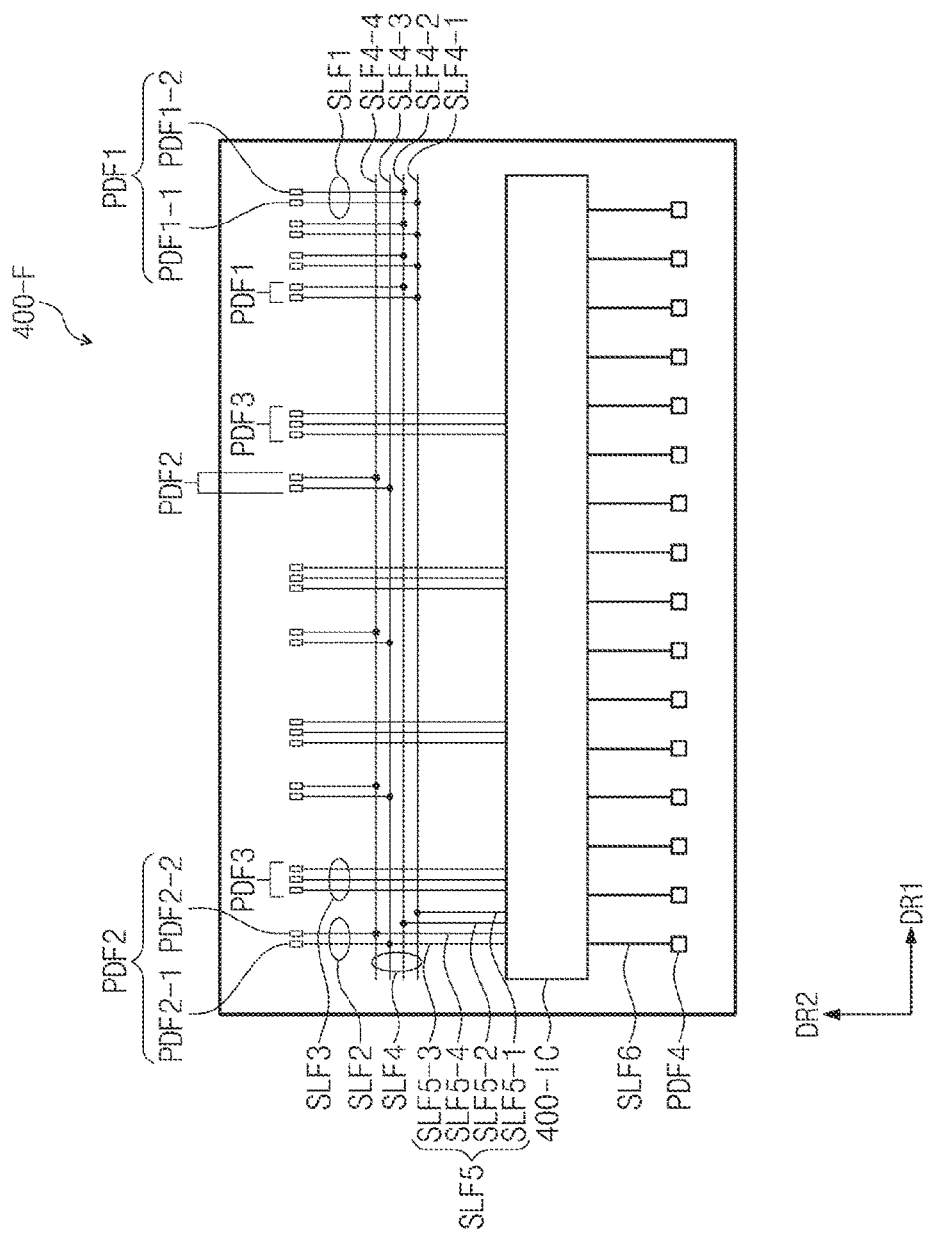
FIG. 8 is an enlarged plan view of a second circuit board of the touch sensing unit of FIG. 5, according to one or more exemplary embodiments.

FIG. 8 is an enlarged plan view of a second circuit board of the touch sensing unit of FIG. 5, according to one or more exemplary embodiments. Hereinafter, the second circuit board 400-F will be described in more detail with reference to FIGS. 5, 7A, and 8.

The second circuit board 400-F includes at least one insulating layer and a plurality of conductive layers. The conductive layers are patterned by a photolithography process, and, as such, a plurality of pads (hereinafter, referred to as substrate pads) and a plurality of signal lines (hereinafter, referred to as substrate signal lines) are formed. Each of the conductive layers includes the substrate signal lines. A portion of the conductive layers includes pads. Signal lines disposed on different layers are electrically connected to each other through contact holes formed through at least one insulating layer. FIG. 8 mainly shows a connection relation between the substrate pads and the substrate signal lines.

The substrate pads may further include first substrate pads PDF1 electrically connected to the first pads PD1 (refer to FIG. 7A), second substrate pads PDF2 electrically connected to the second pads PD2 (refer to FIG. 7A), and third substrate pads PDF3 electrically connected to the third pads PD3 (refer to FIG. 7A). The substrate pads may further include fourth substrate pads PDF4 connected to the driving circuit 400-IC.

The substrate signal lines may include first substrate signal lines SLF1 connected to the first substrate pads PDF1, second substrate signal lines SLF2 connected to the second substrate pads PDF2, and third substrate signal lines SLF3 connected to the third substrate pads PDF3. In addition, the substrate signal lines may further include fourth substrate signal lines SLF4 electrically connecting corresponding first substrate signal lines SLF1 to each other and corresponding second substrate signal lines SLF2 to each other. In addition, the substrate signal lines may also include fifth substrate signal lines SLF5 to connect the fourth substrate signal lines SLF4 to the driving circuit 400-IC. Further, the substrate signal lines may further include sixth substrate signal lines SLF6 to connect the driving circuit 400-IC to the fourth substrate pads PDF4. According to one or more exemplary embodiments, the fourth substrate signal lines SLF4 are distinct from the fifth substrate signal lines SLF5, but the fourth and fifth substrate signal lines SLF4 and SLF5, which are connected to each other, may be referred to as one signal line.

Hereinafter, the electrical connection relation of the sensor columns TSC will be described in detail with reference to FIGS. 7A and 8. For descriptive convenience, the first sensor column TSC and the second sensor column TSC2 shown in FIG. 7A will be mainly described as exemplary of the other sensor columns TSC.

The first sensor RP of the n-th sensor block SB of the first sensor column TSC1 is electrically connected to the first sensor RP of the n-th sensor block SB of the second sensor column TSC2. That is, the first sensors RP arranged in the same sensor row TSL, but different sensor columns TSC are electrically connected to each other. The first sensor RP of the first sensor block SB of the first sensor row TSL1 is electrically connected to the first sensor RP of the second sensor block SB of the first sensor row TSL1. The first pads PD1-1 connected to two first sensors RP of the first sensor row TSL1 shown in FIG. 7A are respectively connected to two first substrate pads PDF1-1 shown in FIG. 8. The two first substrate pads PDF1-1 are electrically connected to the first substrate signal lines SLF1 through one fourth substrate signal line SLF4-1 of the fourth substrate signal lines SLF4. In addition, the fourth substrate signal line SLF4-1 is connected to the driving circuit 400-IC through one fifth substrate signal line SLF5-1 of the fifth substrate signal lines SLF5. Consequently, the first sensor RP of the first sensor block SB of the first sensor row TSL1 and the first sensor RP of the second sensor block SB of the first sensor row TSL1 may receive the same signal from the driving circuit 400-IC. According to one or more exemplary embodiments, the first sensor RP of the first sensor block SB of the fourth sensor row TSL4 is electrically connected to the first sensor RP of the second sensor block SB of the fourth sensor row TSL4.

The second pads PD2-2 connected to two first sensors RP of the fourth sensor row TSL4 shown in FIG. 7A are respectively connected to two second substrate pads PDF2-2 shown in FIG. 8.

The two second substrate pads PDF2-2 are electrically connected to each other through the second substrate signal lines SLF2 and one fourth signal line SLF4-4 of the fourth substrate signal lines SLF4. In addition, the one fourth signal line SLF4-4 is connected to the driving circuit 400-IC through one fifth substrate signal line SLF5-4 of the fifth substrate signal lines SLF5. In this manner, the first sensor RP of the first sensor block SB of the fourth sensor row TSL4 and the first sensor RP of the second sensor block SB of the fourth sensor row TSL4 may receive the same signal from the driving circuit 400-IC.

According to one or more exemplary embodiments, the first sensors RP corresponding to each other among the first sensors RP arranged in different sensor columns TSC are electrically connected to each other, but the second sensors TP arranged in different sensor columns TSC are electrically insulated from each other. The third pads PD3 shown in FIG. 7A are connected to the third substrate pads PDF3 shown in FIG. 8 in one-to-one correspondence. Each of the third substrate signal lines SLF3 connects a corresponding third substrate pad of the third substrate pads PDF3 to the driving circuit 400-IC. In this manner, the first second sensor TP of the first sensor block SB of the first sensor row TSL1 and the first second sensor TP of the second sensor block SB of the first sensor row TSL1 may receive different signals from one another from the driving circuit 400-IC.

The driving circuit 400-IC generates transmission (hereinafter, referred to as "Tx") signals to drive the touch sensing unit 400. The Tx signals may be alternating current signals applied to the sensors as transmission signals. In addition, the driving circuit IC calculates (or otherwise determines) the coordinate information of the position at which the touch event occurs, from received (hereinafter, referred to as "Rx") signals from the touch sensing unit 400. The Rx signals may be alternating current signals obtained from the Tx signals changed by external input. The Tx signals may be referred to as first signals and the Rx signals may be referred to as second signals.

Although not shown in detail in the figures, first ends of the sixth substrate signal lines SLF6 are respectively connected to the pads of the driving circuit 400-IC. Second ends of the sixth substrate signal lines SLF6 are respectively connected to the fourth substrate pads PDF4. The second circuit board 400-F may be electrically connected to the other circuit board or an electronic component, such as a connector, through the fourth substrate pads PDF4. The second circuit board 400-F may receive control signals from a central control circuit disposed on the other circuit board through the fourth substrate pads PDF4 to drive the touch sensing unit 400. The control signals to drive the touch sensing unit 400 may be, but are not limited to, signals to control a scan driving circuit 410, a touch sensing circuit 420, and a switching circuit 430, which will be described in more detail with reference to FIGS. 9A and 9B.

Figure 9A:
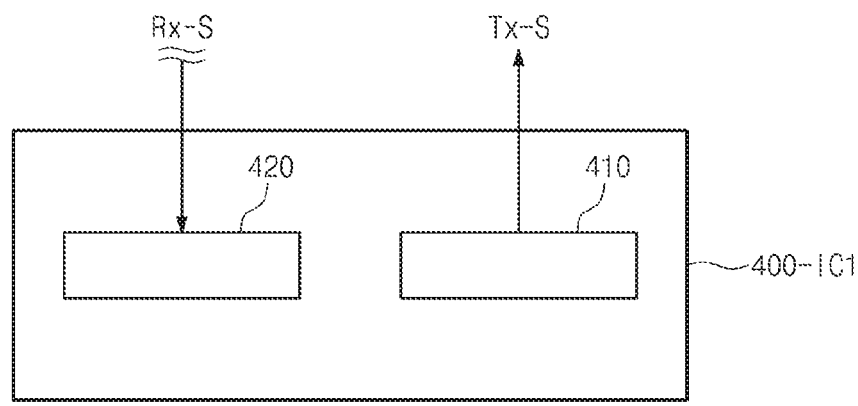
FIGS. 9A and 9B are block diagrams of a driving circuit of a touch sensing unit, according to one or more exemplary embodiments.
Figure 9B:
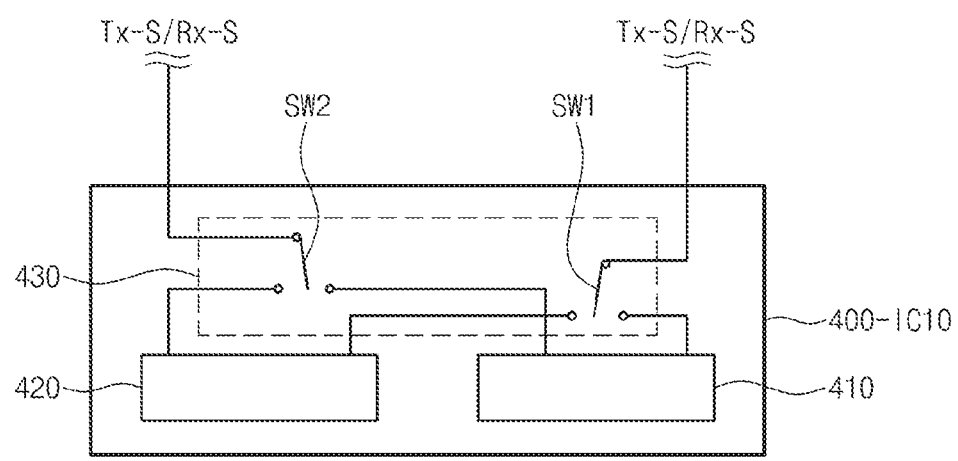

FIGS. 9A and 9B are block diagrams of a driving circuit of a touch sensing unit, according to one or more exemplary embodiments. The driving circuit may be driving circuit 400-IC1 and/or 400-IC10. Hereinafter, the driving circuits 400-IC1 and 400-IC10 of the touch sensing unit will be described in more detail.

Referring to FIG. 9A, the driving circuit 400-IC1 may include the scan driving circuit 410 generating the Tx signals Tx-S and the touch sensing circuit 420 calculating (or otherwise determining) the coordinate information of the position at which a touch event occurs, from the Rx signals Rx-S. The Tx signals Tx-S are applied to one sensor of the first sensors RP (refer to FIG. 7A) and the second sensors TP (refer to FIG. 7A) through a portion of the substrate signal lines SLF1 to SLF5 of the second circuit board 400-F. The Rx signals Rx-S are applied to the touch sensing circuit 420 through the portion of the substrate signal lines SLF1 to SLF5 of the second circuit board 400-F from the other sensors of the first sensors RP and the second sensors TP. According to one or more exemplary embodiments, the coordinate information of the position at which the touch event occurs may be obtained by a mutual capacitance manner.

Hereinafter, the Tx signals Tx-S applied to the second sensors TP will be described. The Tx signals Tx-S output from the scan driving circuit 410 are applied to the second sensors TP through the third substrate signal lines SLF3, the third substrate pads PDF3, the third pads PD3, and the third signal lines SL3. The scan driving circuit 410 applies the Tx signals Tx-S having different information from each other to the second sensors TP. The Tx signals Tx-S are alternating current signals. Here, the expression that the Tx signals Tx-S have different information means that the Tx signals Tx-S have different time information, different frequency information, and/or different code information. The Tx signals Tx-S modulated by time division multiple access are activated with different time periods from each other. For instance, periods in which the Tx signals Tx-S have a high level are different from each other. The Tx signals Tx-S modulated by frequency division multiple access have different frequencies from each other. The Tx signals Tx-S modulated by code division multiple access have different code information from each other.

The first sensor RP is capacitively coupled to the second sensor TP adjacent to the first sensor RP by the Tx signals Tx-S applied to the second sensors TP (refer to FIG. 7A). For instance, when an input member is disposed on the first and second sensors RP and TP, which are capacitively coupled to each other, a capacitance between the first and second sensors RP and TP varies. The touch sensing circuit 420 senses the variation of the capacitance to calculate the coordinate information of the input member. For instance, the touch sensing circuit 420 may include an amplifier, a noise filter, and an analog-to-digital converter. The amplifier amplifies the Rx signals Rx-S applied thereto. The noise filter removes noise from the amplified Rx signals Rx-S. The analog-to-digital converter converts the Rx signals Rx-S, from which the noise is removed, to digital signals. The coordinate information of the position, at which the touch event occurs may be calculated from the digital signals.

Referring to FIG. 9B, the driving circuit 400-IC10 may include the scan driving circuit 410, the touch sensing circuit 420, and the switching circuit 430. According to one or more exemplary embodiments, the coordinate information of the position at which the touch event occurs may be obtained by a self-capacitance manner or a mutual capacitance manner.

The switching circuit 430 selectively connects the scan driving circuit 410 and the touch sensing circuit 420 to the first and second pads PD1 and PD2 (refer to FIG. 7A) or the third pads PD3 (refer to FIG. 7A). Accordingly, the Tx signals Tx-S may be selectively applied to the first sensors RP (refer to FIG. 7A) and the second sensors TP (refer to FIG. 7A). The switching circuit 430 includes, for instance, a first switch SE1 and a second switch SE2. As seen in FIG. 9B, the switching circuit 430 includes one first switch SE1 and one second switch SE2, but the number of the first and second switches SE1 and SE2 are determined depending on the number of the sensor columns, the sub-columns, and the sensor rows. The method of obtaining the coordinate information of the input position using the mutual capacitance manner is the same as described with reference to FIG. 9A. To obtain the coordinate information of the input position using the self-capacitance manner, the Tx signals Tx-S may be applied to each of the first sensors RP and the second sensors TP. The coordinate information of the input position may be obtained by sensing the variation of the capacitance occurring in the sensors to which the Tx signals Tx-S are applied.

FIGS. 10A, 10B, 10C, and 10D are enlarged plan views of touch sensing units, according to one or more exemplary embodiments. Hereinafter, the touch sensing units 400-1 to 400-3 will be described in more detail with reference to FIGS. 10A to 10C. In FIGS. 10A to 10D, detailed descriptions of the same elements as those in FIGS. 1 to 9B will be omitted to avoid redundancy and obscuring exemplary embodiments described herein.

Figure 10A:
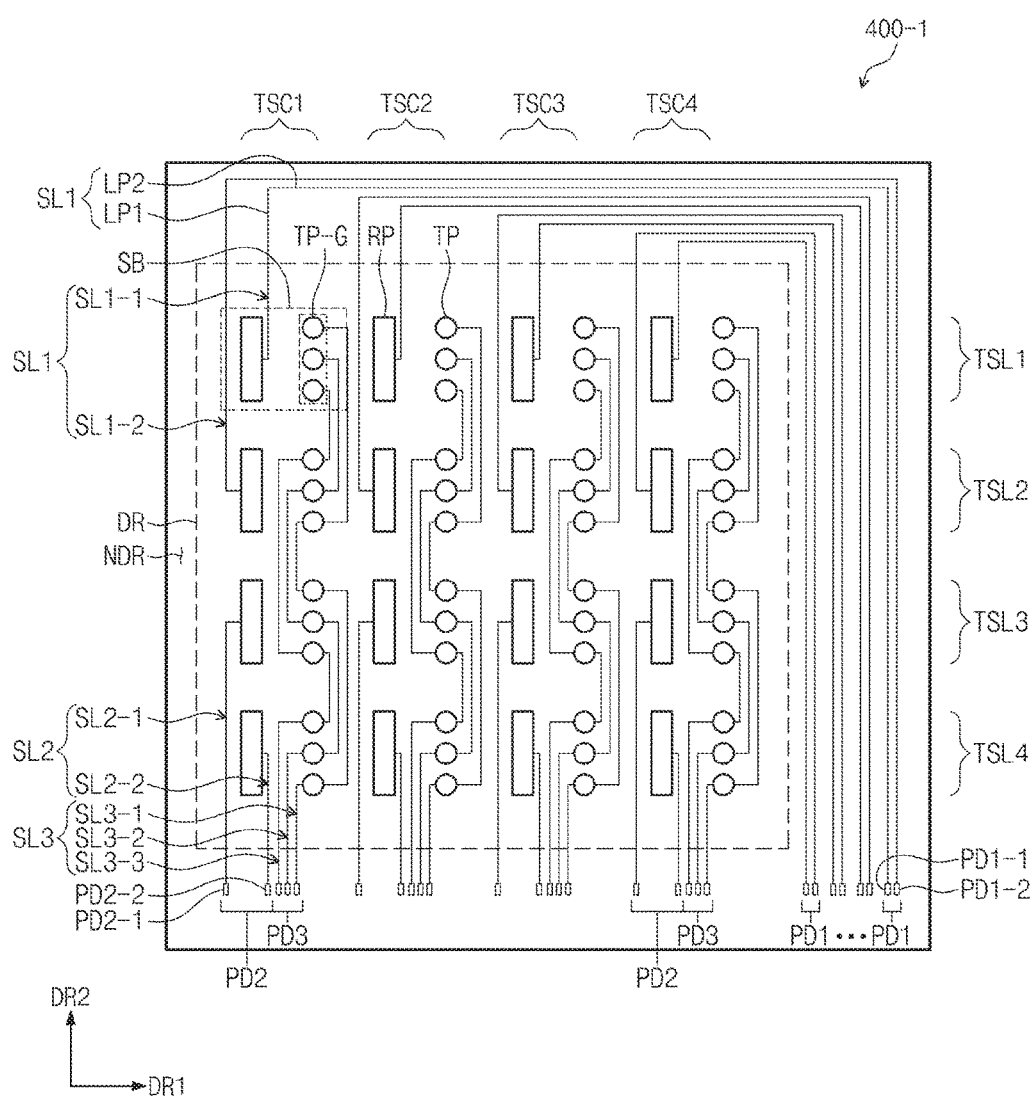
FIGS. 10A, 10B, 10C, and 10D are enlarged plan views of a touch sensing unit, according to one or more exemplary embodiments.
Figure 10B:
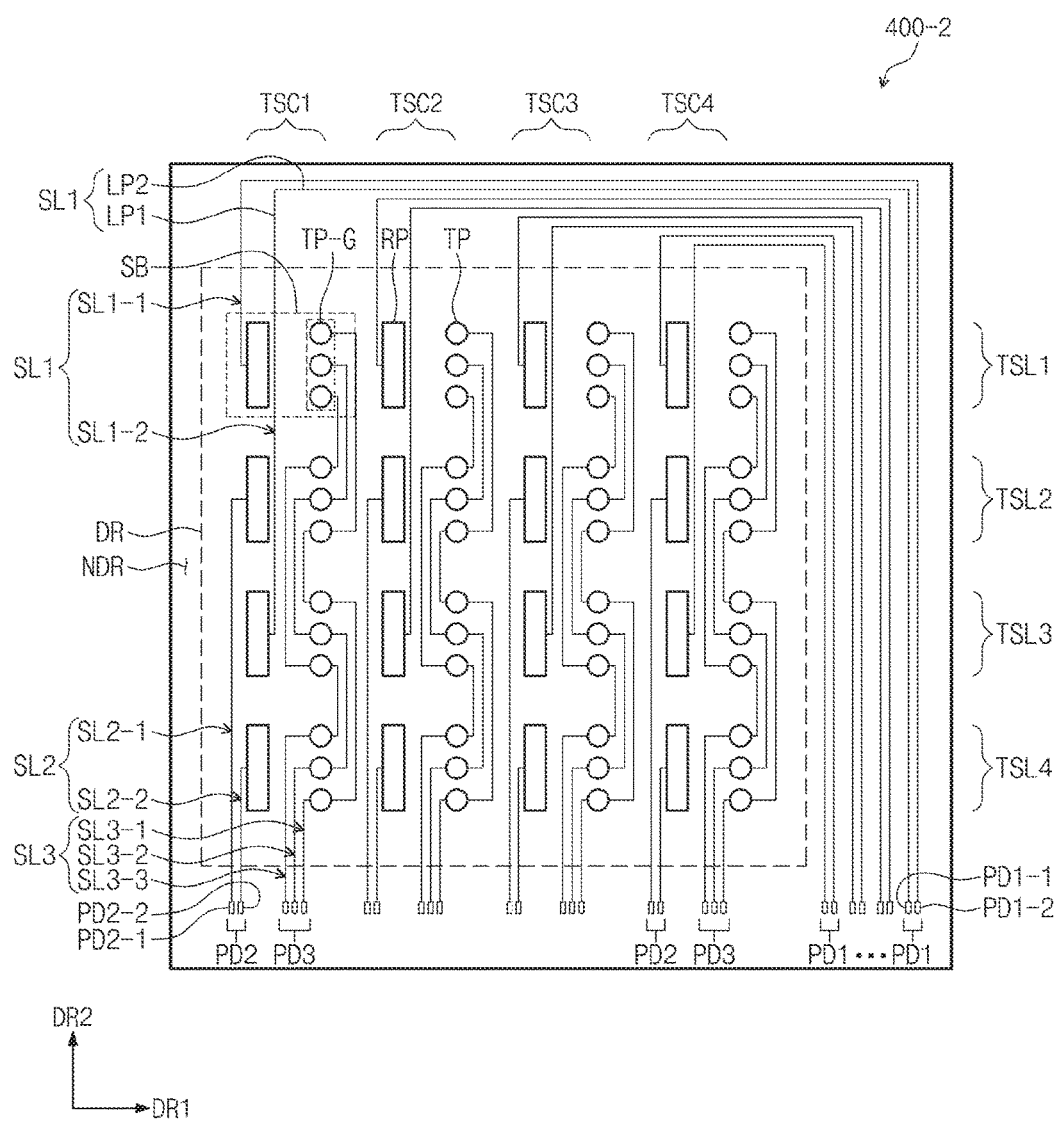
Figure 10C:
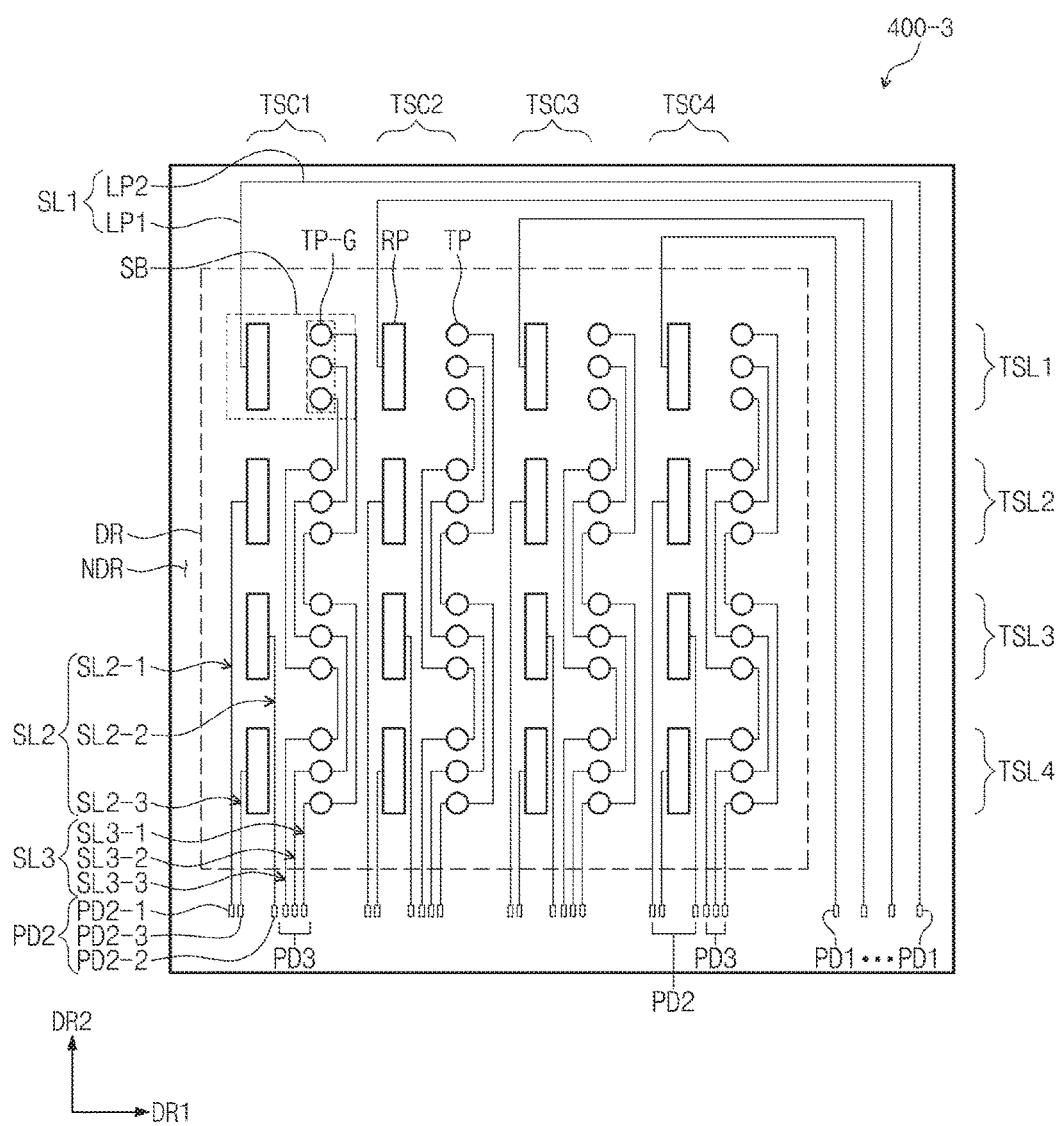
Figure 10D:
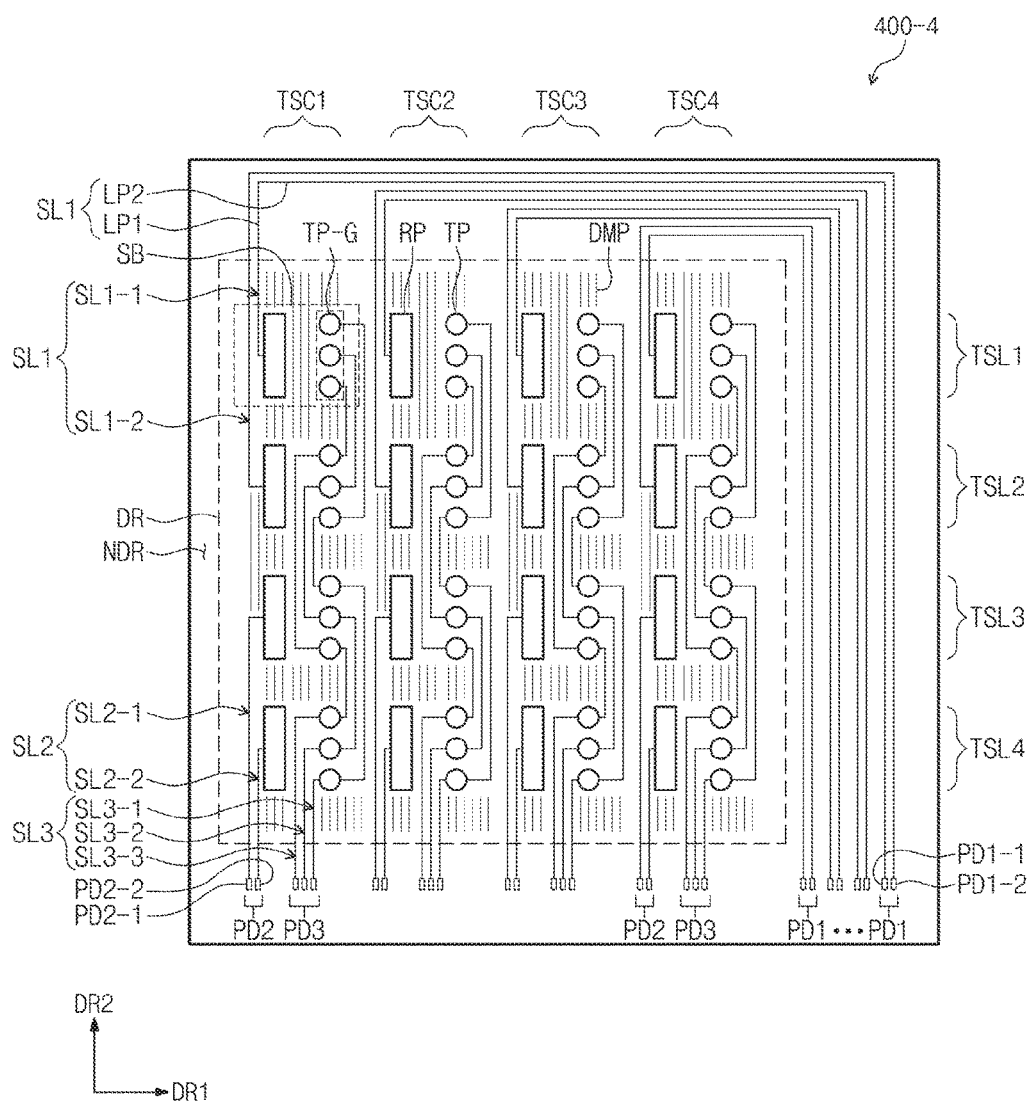

The touch sensing units 400-1 to 400-3 shown in FIGS. 10A to 10C have the same structure and function as the touch sensing unit 400 shown in FIG. 7B except for an arrangement of the first and second signal lines SL1 and SL2. As shown in FIG. 10A, each of the first signal lines SL1 connected to the first sensor RP of the first sensor block SB and the second signal line SL2 connected to the first sensor RP of the fourth sensor block SB is disposed at a right side of the corresponding first sensor RP in the sensor columns TSC. As seen in FIG. 10B, the first signal lines SL1 may be respectively connected to the first sensor RP of the first sensor block SB and the first sensor RP of the third sensor block SB in the sensor columns TSC. As seen in FIG. 10C, the second signal lines SL2 may be respectively connected to the first sensors RP of the second sensor block SB to the fourth sensor block SB in the sensor columns TSC. To this end, the first signal lines SL1 are connected to the first sensor RP of the first sensor block SB in the sensor columns TSC. The touch sensing unit 400-4 shown in FIG. 10D further includes floated dummy patterns DMP different from the touch sensing unit 400 shown in FIG. 7B. The dummy patterns DMP include the same material as the first sensors RP and/or the second sensors TP. The dummy patterns DMP compensate for an optical efficiency, e.g., a refractive index or a reflectance, of areas of the display area DR in which the first and second sensors RP and TP are not disposed.

Figure 11A:
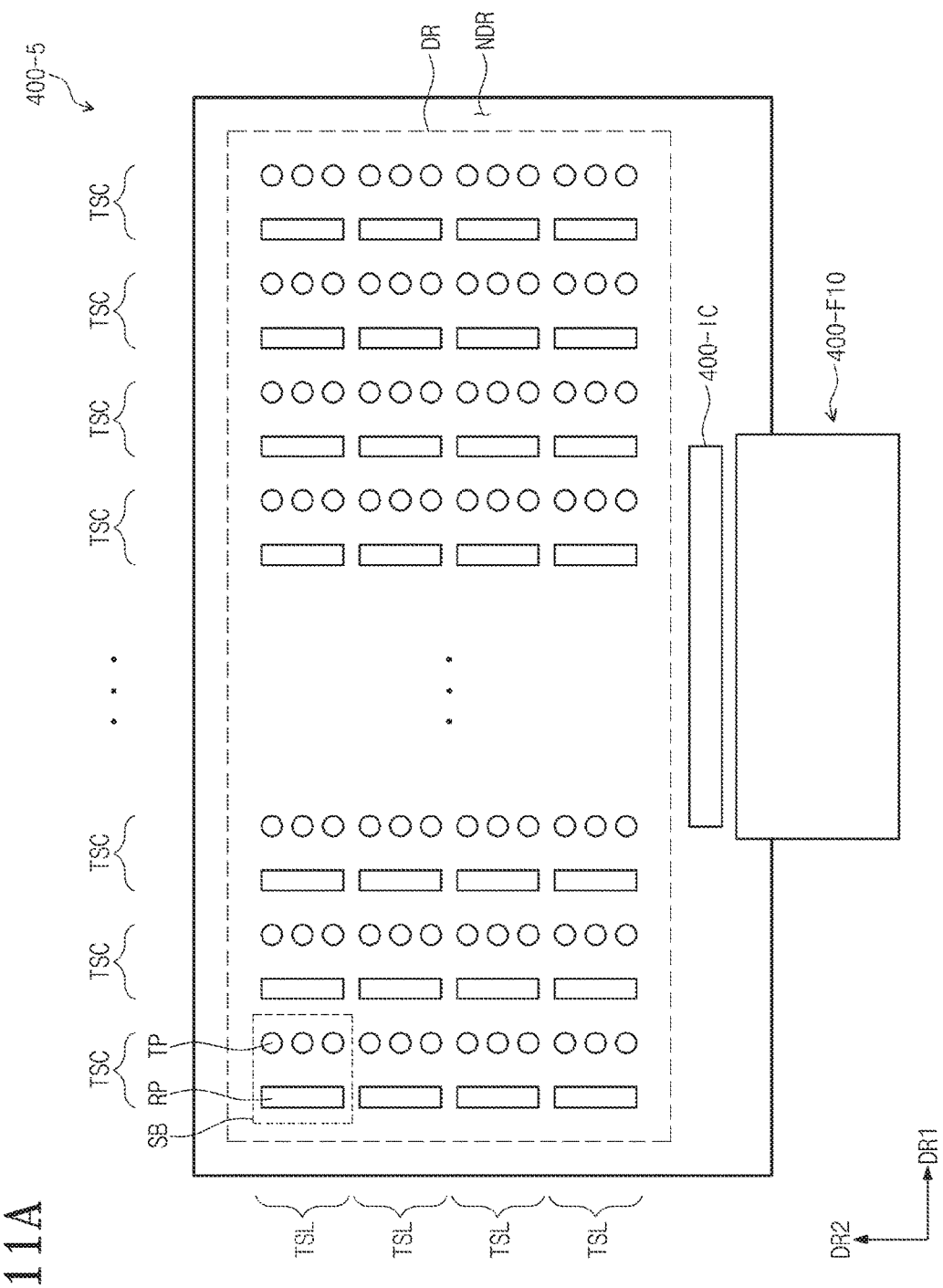
FIG. 11A is a plan view of a touch sensing unit, according to one or more exemplary embodiments.
Figure 11B:
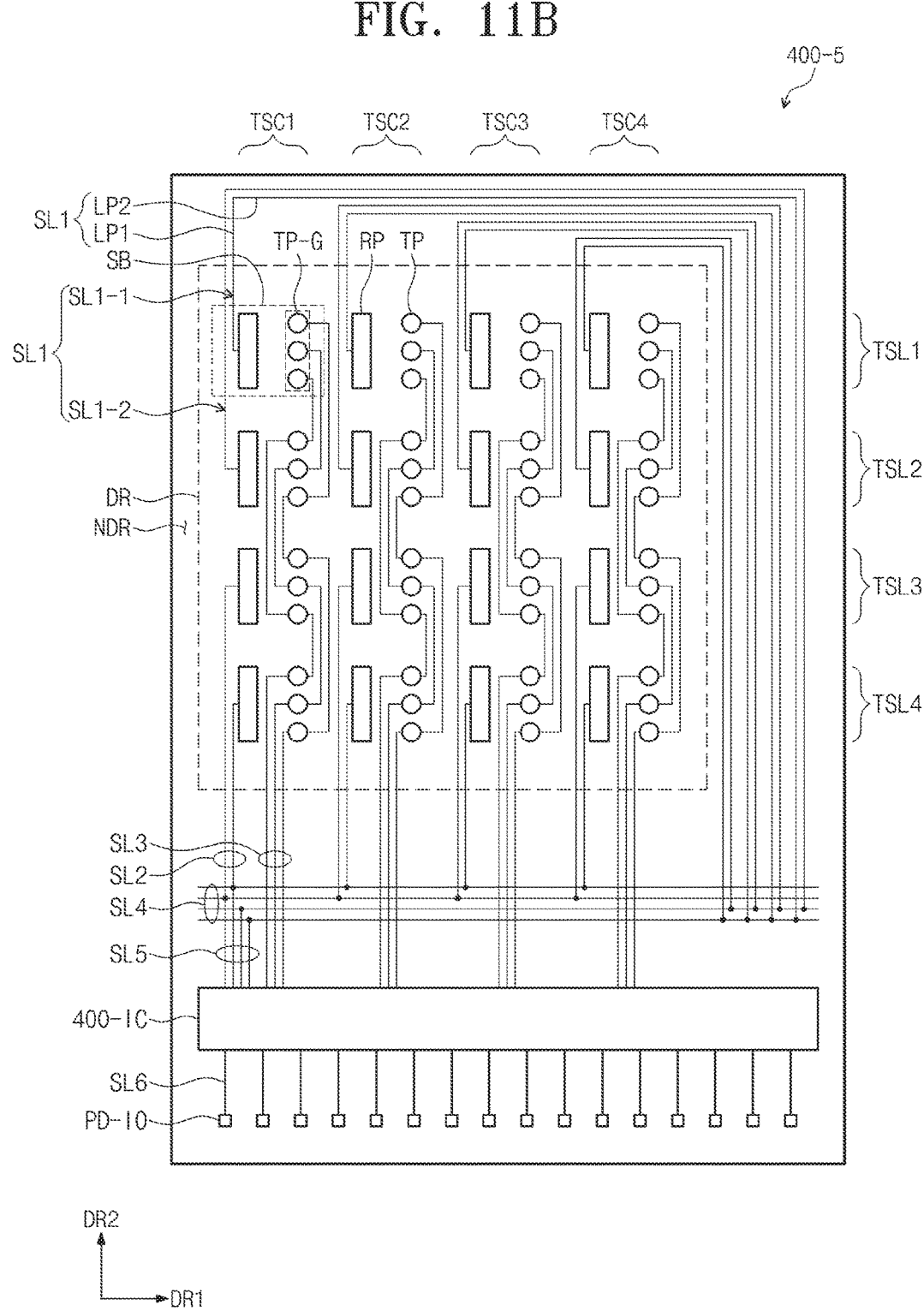
FIG. 11B is an enlarged plan view of the touch sensing unit of FIG. 11A, according to one or more exemplary embodiments.
Figure 12A:
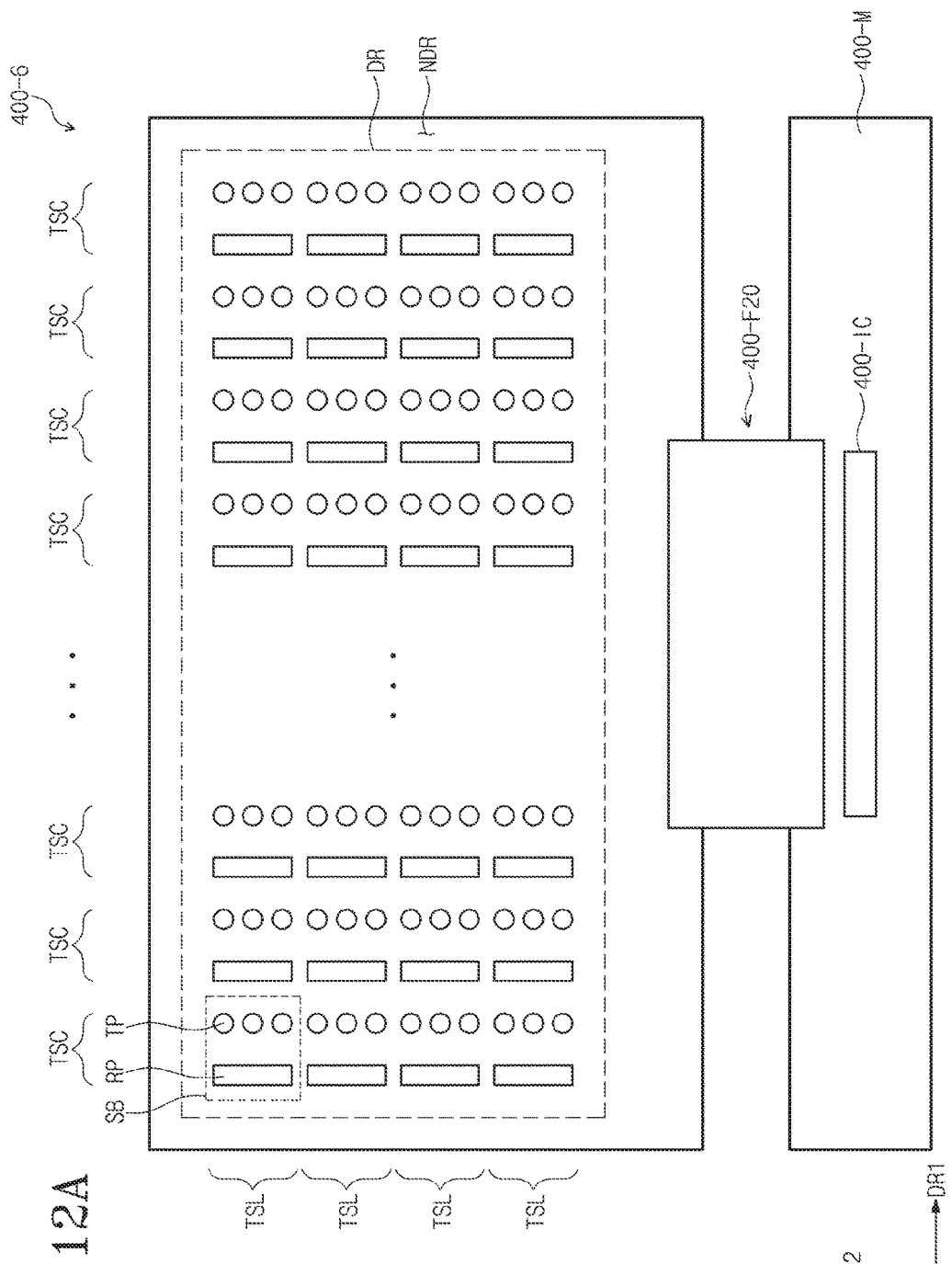
FIG. 12A is a plan view of a touch sensing unit, according to one or more exemplary embodiments.
Figure 12B:
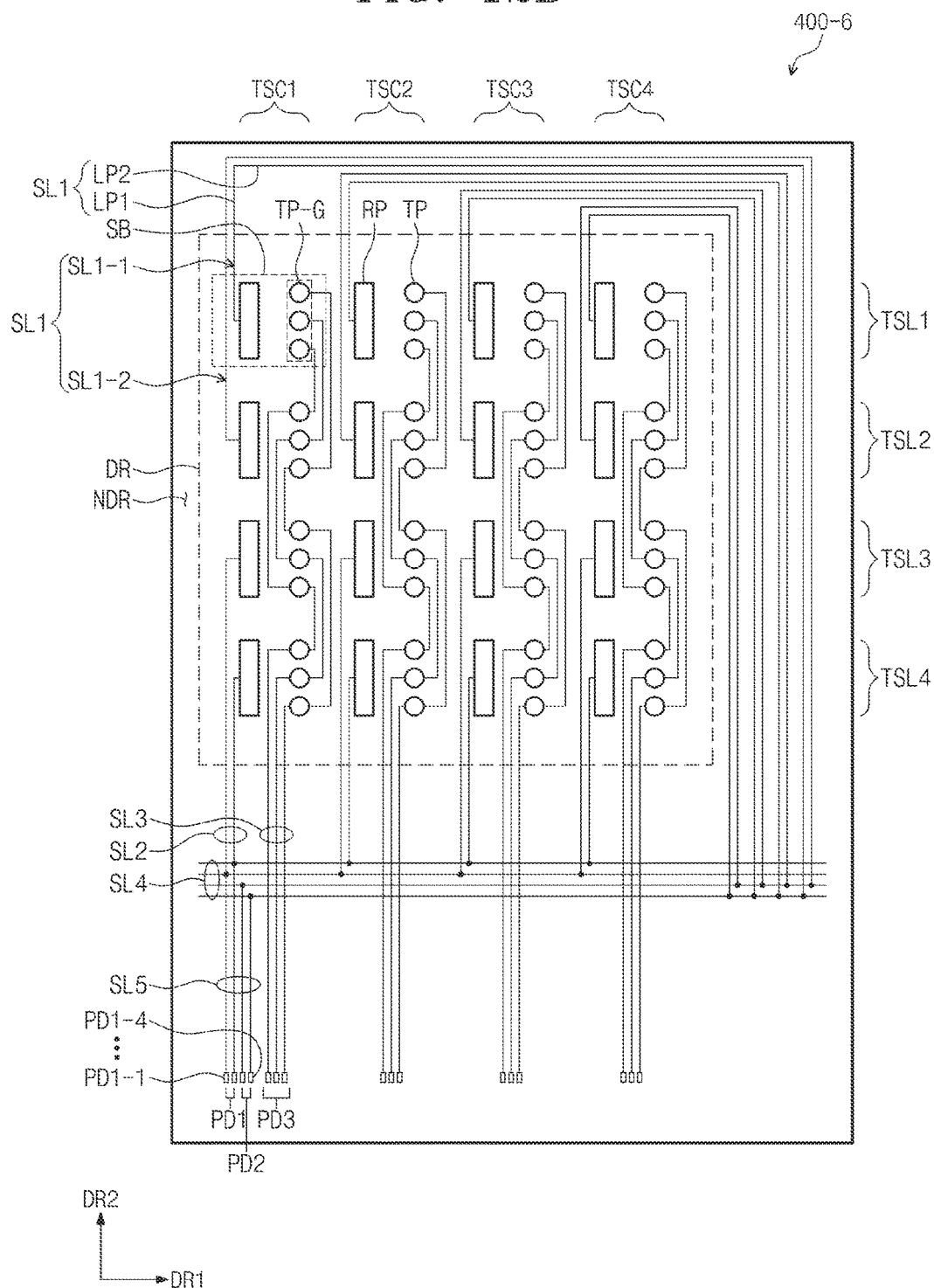
FIG. 12B is an enlarged plan view of the touch sensing unit of FIG. 12A, according to one or more exemplary embodiments.

FIG. 11A is a plan view of a touch sensing unit, according to one or more exemplary embodiments. FIG. 11B is an enlarged plan view of the touch sensing unit of FIG. 11A, according to one or more exemplary embodiments. FIG. 12A is a plan view of a touch sensing unit, according to one or more exemplary embodiments. FIG. 12B is an enlarged plan view of the touch sensing unit of FIG. 12A, according to one or more exemplary embodiments. Hereinafter, the touch sensing units 400-5 and 400-6 will be described in detail with reference to FIGS. 11A, 11B, 12A, and 12B. In FIGS. 11A to 12B, detailed descriptions of the same elements as those in FIGS. 1 to 10D will be omitted to avoid redundancy and avoid obscuring exemplary embodiments described herein.

Referring to FIGS. 11A and 11B, the driving circuit 400-IC may be mounted on the non-display area NDR of the touch sensing unit 400-5. The touch sensing unit 400-5 has different layer structures in accordance with the display area DR and the non-display area NDR. For instance, one conductive layer is disposed in the display area DR and conductive layers and insulating layers are disposed in the non-display area NDR. Since the first sensors RP are not overlapped with the second sensors TP, the conductive layer is formed in the display area DR in a single-layer structure. Since the first to third signal lines SL1 to SL3 do not cross each other, the conductive layer is formed in the display area DR in the single-layer structure. In this manner, the elements in the display area DR are formed by patterning the conductive layers, each having the single-layer structure.

Fourth signal lines SL4 and fifth signal lines SL5 respectively corresponding to the fourth substrate signal lines SLF4 and the fifth substrate signal lines SLF5 described with reference to FIG. 8 are disposed in the non-display area NDR of touch sensing unit 400-5. According to one or more exemplary embodiments, the fourth signal lines SL4 are distinct from the fifth signal lines SL5, but the fourth and fifth signal lines SL4 and SL5, which are connected to each other, may be referred to as one signal line. Since the first and second signal lines SL1 and SL2 may be directly connected to the fourth signal lines SL4, the first and second substrate signal lines SLF1 and SLF2 shown in FIG. 8 may be omitted.

The driving circuit 400-IC is connected to the third signal lines SL3 and the fifth signal lines SL5. According to one or more exemplary embodiments, some pad groups among the pad groups shown in FIGS. 7A and 8 may be omitted. Input/output pads PD-IO corresponding to the fourth substrate pads PDF4 in FIG. 8 are disposed on the touch sensing unit 400-5 in FIG. 11B. The driving circuit 400-IC and the input/output pads PD-IO are connected to each other by sixth signal lines SL6. Although not shown, the second circuit board 400-F10 may include substrate pads connected to the input/output pads PD-IO of the touch sensing unit 400-5 and substrate signal lines connected to the substrate pads. The second circuit board 400-F10 may be connected to one or more electronic components, e.g., another circuit board or connector.

Referring to FIGS. 12A and 12B, the driving circuit 400-IC may be disposed on the other circuit board 400-M. The touch sensing unit 400-6 may not include the driving circuit 400-IC, the sixth signal lines SL6, and the input/output pads PD-IO when compared with the touch sensing unit 400-5 described with reference to FIGS. 11A and 11B. Although not shown, a second circuit board 400-F20 may include substrate signal lines, input substrate pads connected to first ends of the substrate signal lines and corresponding to the first to third pads PD1 to PD3, and output substrate pads connected to second ends of the substrate signal lines.

Figure 13:
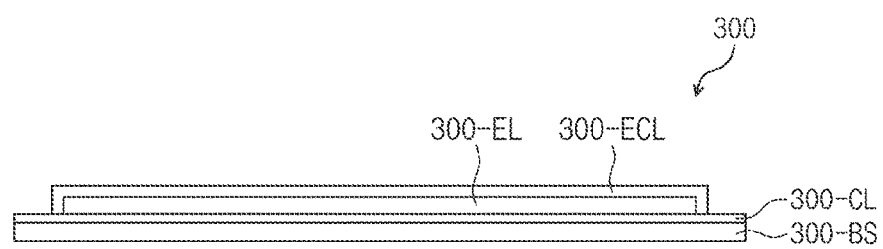
FIG. 13 is an enlarged cross-sectional view of a display panel, according to one or more exemplary embodiments.
Figure 13:
Figure 14:
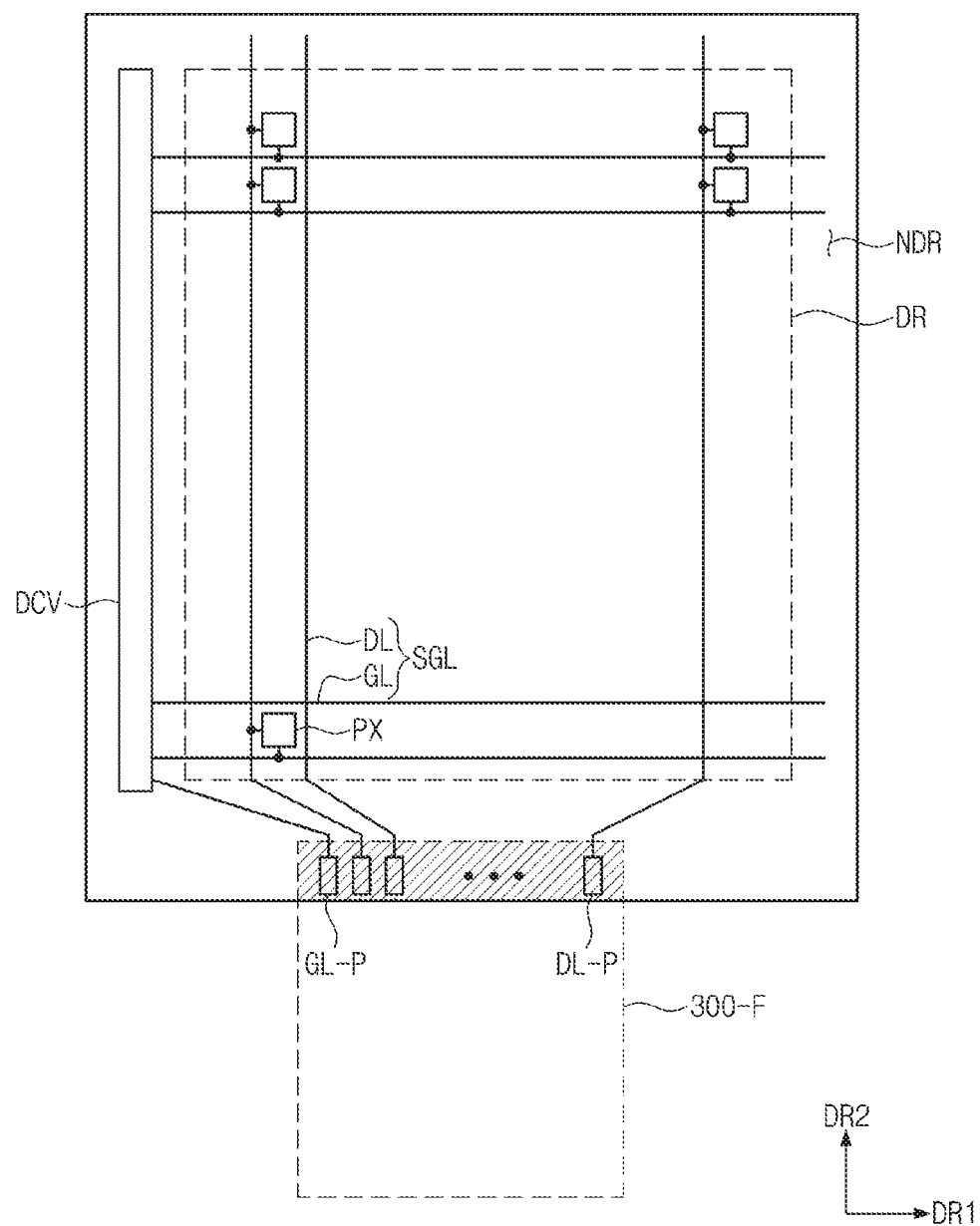
FIG. 14 is a plan view of the display panel of FIG. 13, according to one or more exemplary embodiments.
Figure 15:
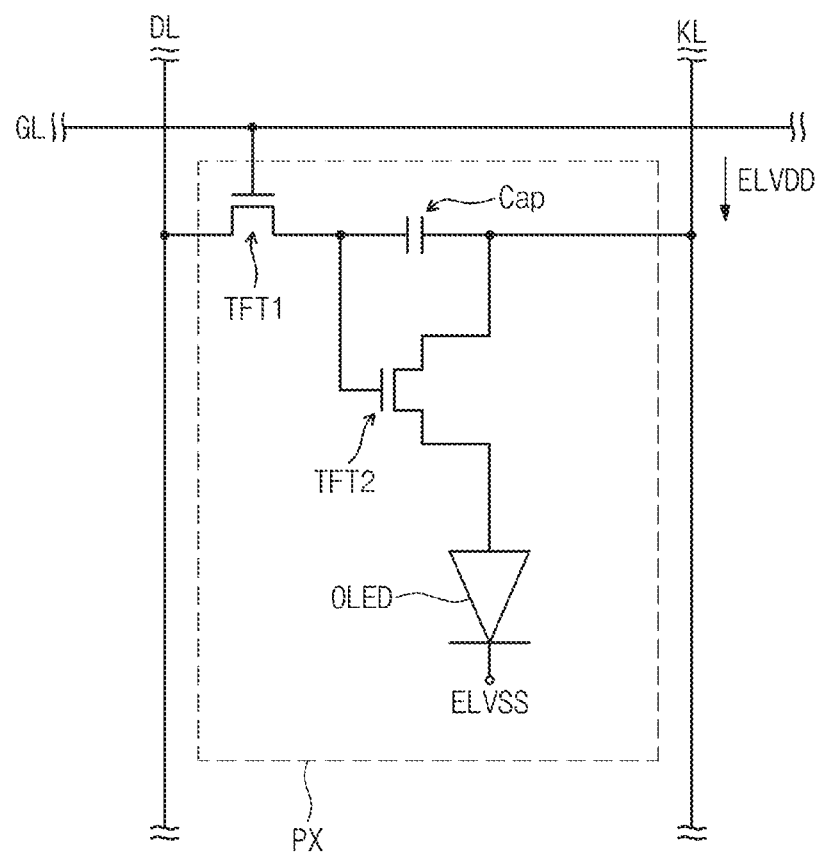
FIG. 15 is an equivalent circuit diagram of a pixel, according to one or more exemplary embodiments.

FIG. 13 is an enlarged cross-sectional view of a display panel, according to one or more exemplary embodiments. FIG. 14 is a plan view of the display panel of FIG. 13, according to one or more exemplary embodiments. FIG. 15 is an equivalent circuit diagram of a pixel, according to one or more exemplary embodiments. Hereinafter, the display panel 300 will be described in more detail with reference to FIGS. 13 to 15. In FIGS. 13 to 15, detailed descriptions of the same elements as those in FIGS. 1 to 12B will be omitted to avoid redundancy and obscuring exemplary embodiments described herein.

Referring to FIG. 13, the display panel 300 includes a base member 300-BS, a circuit layer 300-CL, an element layer 300-EL, and an encapsulation layer 300-ECL. Although not shown, the display panel 300 may further include an optical member disposed on the encapsulation layer 300-ECL, e.g., a phase retardation plate, a polarizing plate, etc.

The base member 300-BS may include at least one plastic film. The base member 300-BS may include two plastic films and inorganic layers disposed between the two plastic films, e.g., at least one silicon nitride thin film layer and/or at least one silicon oxide thin film layer. The base member 300-BS may include at least one of polyimide (PI), polyethylenenaphthalate (PEN), polyethersulphone (PES), and fiber reinforced plastics (FRP).

The circuit layer 300-CL includes a plurality of signal lines SGL disposed on the display panel 300 and electronic elements disposed on the display panel 300. In addition, the circuit layer 300-CL includes a plurality of insulating layers to insulate the signal lines SGL from the electronic elements.

Referring to FIGS. 14 and 15, the circuit layer 300-CL includes the signal lines SGL. The signal lines SGL include gate lines GL extending in the first direction DR1 and data lines DL extending in the second direction DR2. Each of the gate lines GL and each of the data lines DL are connected to a corresponding pixel of the pixels PX. The circuit layer 300-CL includes circuits of the pixel PX, e.g., at least one thin film transistor (such as first and second thin film transistors TFT1 and TFT2) and at least one capacitor (such as capacitor Cap). The circuit layer 300-CL may further include a gate driving circuit DCV disposed at (or near) a side of the non-display area NDR. The gate lines GL and the data lines DL include a gate pad part GL-P and data pad parts DL-P, respectively, that are disposed in the non-display area NDR. The gate pad part GL-P and the data pad parts DL-P are connected to the first circuit board 300-F. The display panel 300 is connected to a main driving circuit through the first circuit board 300-F.

The element layer 300-EL includes display elements. As shown in FIGS. 14 and 15, the element layer 300-EL includes an organic light emitting diode OLED of the pixel PX. The element layer 300-EL may further include one or more electronic elements to assist the organic light emitting diode OLED. The encapsulation layer 300-ECL encapsulates the element layer 300-EL. The element layer 300-EL includes a thin film encapsulation layer, e.g., a plurality of inorganic thin film layers and a plurality of organic thin film layers. According to one or more exemplary embodiments, the encapsulation layer 300-ECL may be replaced with an encapsulation substrate. The encapsulation substrate may be disposed over, and, thereby, spaced apart from the base member 300-BS such that the element layer 300-EL is disposed between the encapsulation substrate and the base member 300-BS. To this end, a sealant may be provided along an edge of the encapsulation substrate and the base member 300-BS to form a space.

According to one or more exemplary embodiments, the base member 400-BS (refer to FIG. 4) of the touch sensing unit 400 may be disposed on the encapsulation layer 300-ECL or the encapsulation substrate. Further, the conductive layer 400-CL (refer to FIG. 4) of the touch sensing unit 400 may be directly disposed on the encapsulation layer 300-ECL or the encapsulation substrate. That is, the encapsulation layer 300-ECL or the encapsulation substrate may provide a base surface on which the first and second sensors RP and TP are disposed. In addition, the first and second sensors RP and TP may be directly disposed on the other functional layer, e.g., an insulating layer, a refractive index control layer, etc., disposed on the surface of the encapsulation layer 300-ECL or the encapsulation substrate. Further, the encapsulation layer 300-ECL including thin film layers, and one layer of the thin film layers may serve as the base surface. For instance, the first and second sensors RP and TP may be disposed on one inorganic layer. The inorganic layer or the organic layer may be stacked on the inorganic layer serving as the base surface.

Figure 16:
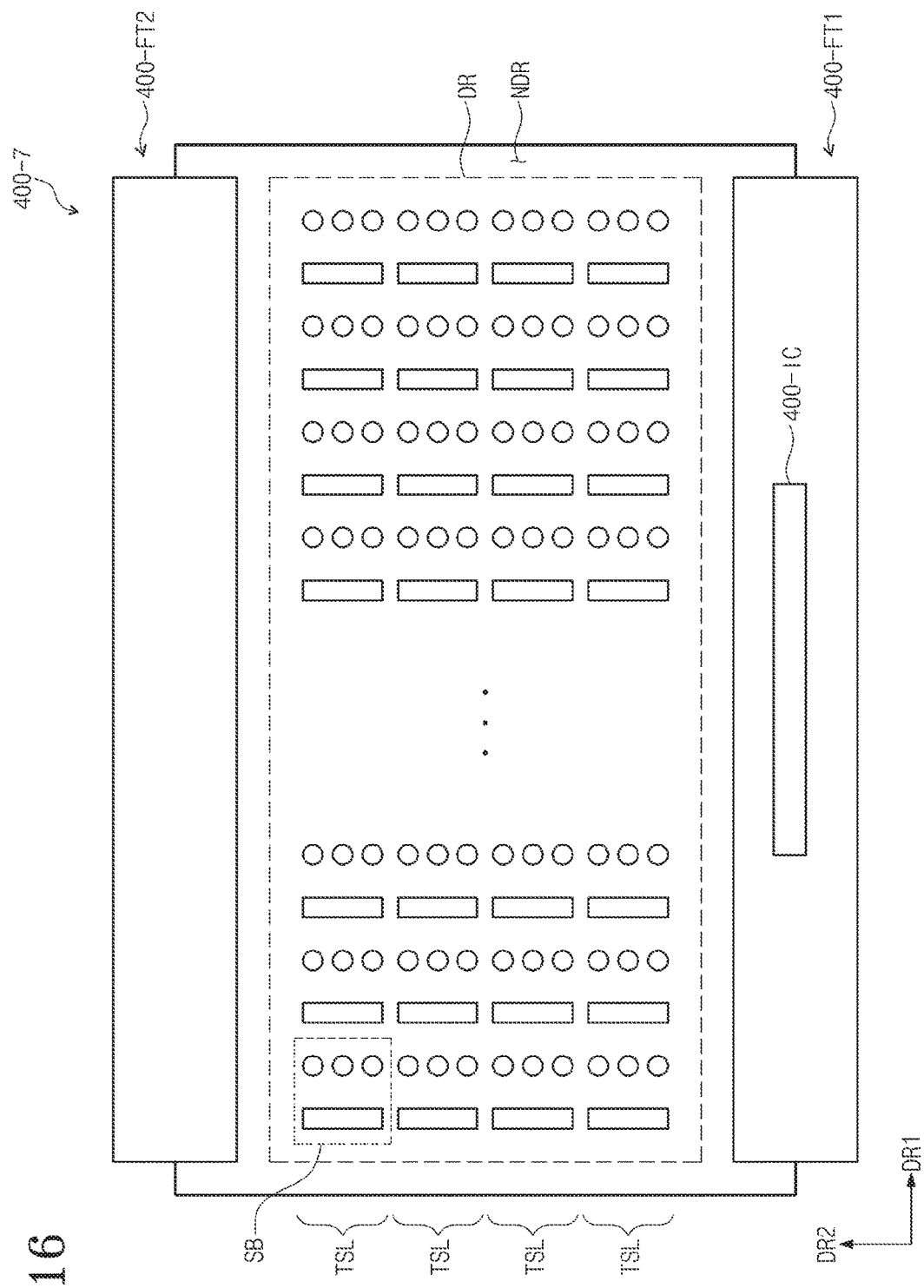
FIG. 16 is a plan view of a touch sensing unit, according to one or more exemplary embodiments.
Figure 17:
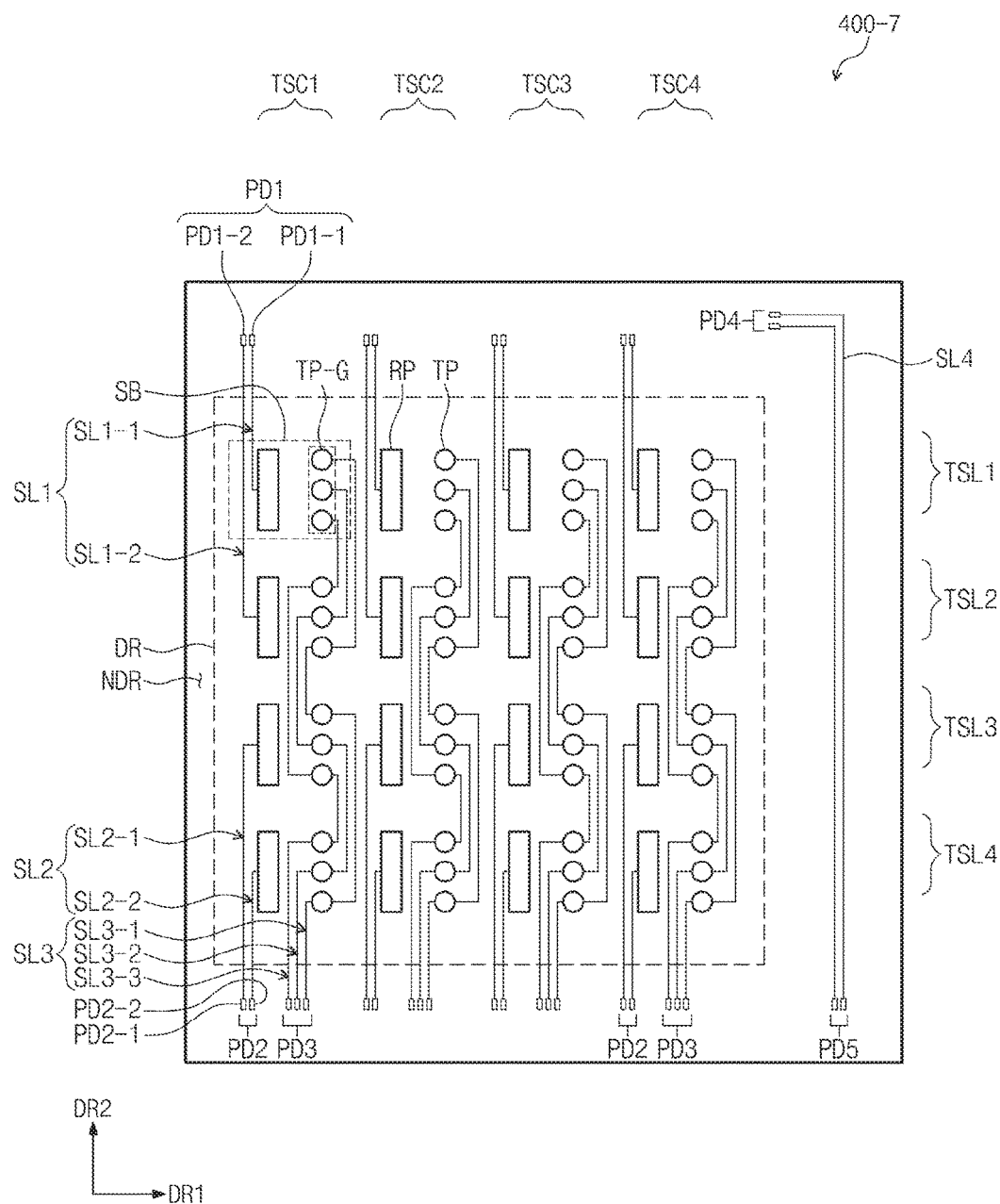
FIG. 17 is an enlarged plan view of the touch sensing unit of FIG. 16, according to one or more exemplary embodiments.
Figure 18:
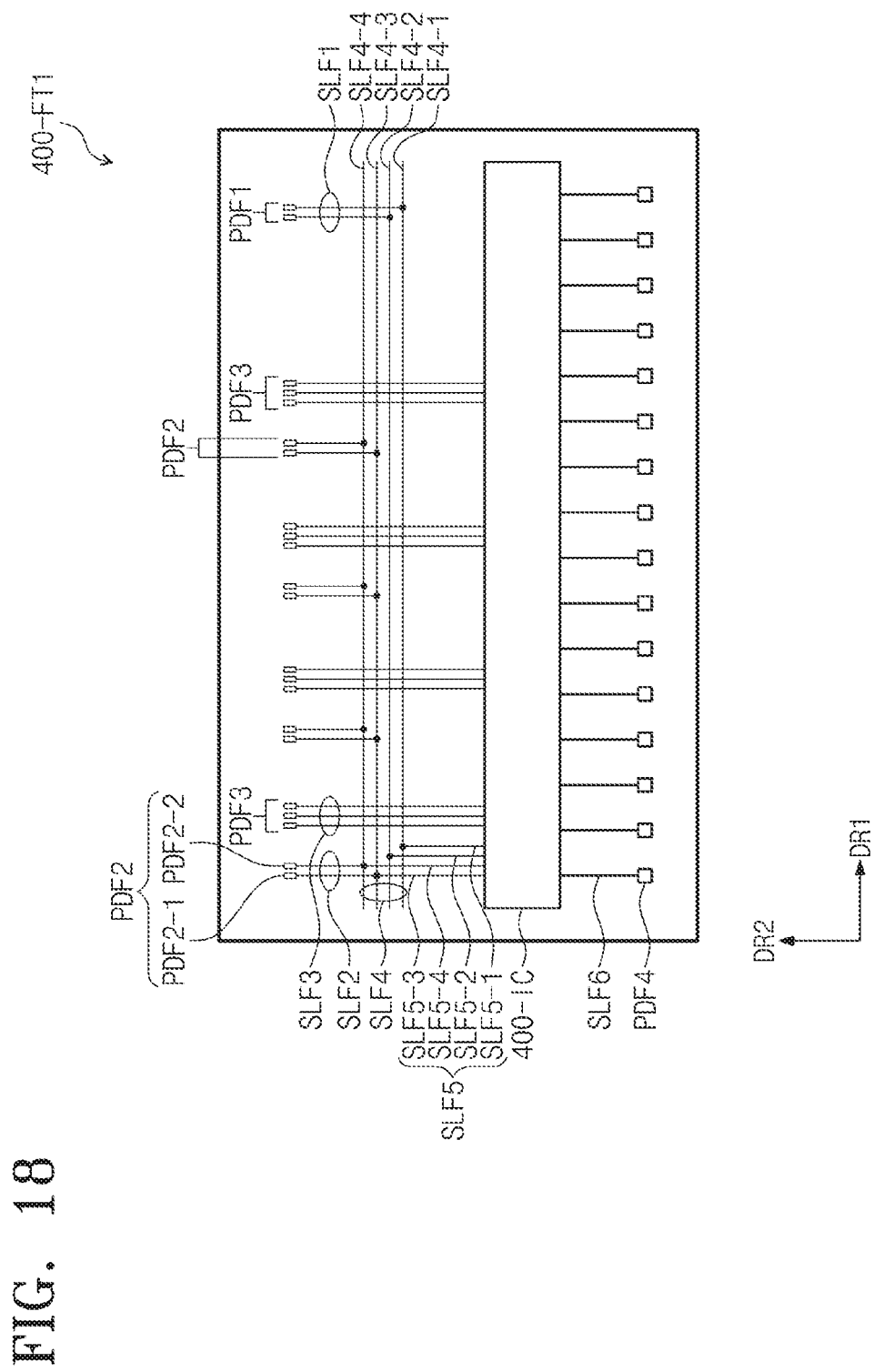
FIG. 18 is an enlarged plan view of a first circuit board of the touch sensing unit of FIG. 17, according to one or more exemplary embodiments.
Figure 19:
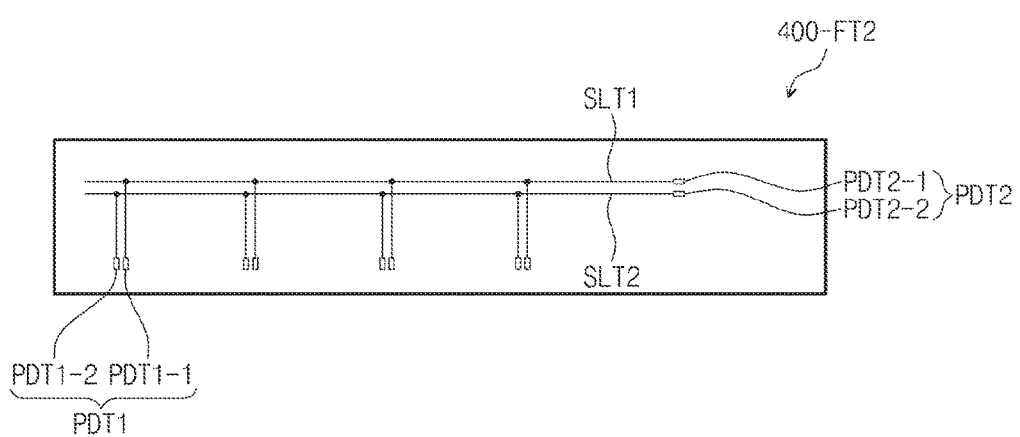
FIG. 19 is an enlarged plan view of a second circuit board of the touch sensing unit of FIG. 17, according to one or more exemplary embodiments.

FIG. 16 is a plan view of a touch sensing unit, according to one or more exemplary embodiments. FIG. 17 is an enlarged plan view showing the touch sensing unit of FIG. 16, according to one or more exemplary embodiments. FIG. 18 is an enlarged plan view of a first circuit board of the touch sensing unit of FIG. 17, according to one or more exemplary embodiments. FIG. 19 is an enlarged plan view of a second circuit board of the touch sensing unit of FIG. 17, according to one or more exemplary embodiments. Hereinafter, the touch sensing unit 400-7 will be described in more detail with reference to FIGS. 16 to 19. In FIG. 16 to 19, detailed descriptions of the same elements as those in FIGS. 1 to 15 will be omitted to avoid redundancy and obscuring exemplary embodiments described herein.

The touch sensing unit 400-7 includes a plurality of sensor blocks SB arranged in the display area DR. The first type circuit board 400-FT1 and the second type circuit board 400-FT2 are bonded to the non-display area NDR of the touch sensing unit 400-7. Different from the touch sensing unit 400 shown in FIG. 7A, the touch sensing unit 400-7 further includes fourth signal lines SL4. Fourth pads PD4 are connected to first ends of the fourth signal lines SL4 and fifth pads PD5 are connected to second ends of the fourth signal lines SL4. In addition, the first pads PD1 and the second pads PD2 are disposed in different areas from each other in the non-display area NDR. The first pads PD1 are disposed adjacent to upper ends of the sensor columns TSC1 to TSC4 and the second pads PD2 are disposed adjacent to lower ends of the sensor columns TSC1 to TSC4. The first signal lines SL1 may include only the first portion LP1 of the first signal lines SL1.

The first type circuit board 400-FT1 may be substantially the same as the circuit board 400-F shown in FIG. 8. The first type circuit board 400-FT1 includes the first substrate pads PDF1, but the number of the first substrate pads PDF1 included in the first type circuit board 400-FT1 is smaller than that of the circuit board 400-F. The second type circuit board 400-FT2 electrically connects the first sensors RP corresponding to the sensor columns TSC to one another. In addition, the second type circuit board 400-F2 electrically connects the first pads PD1 and the fourth pads PD4 to one another.

As seen in FIG. 19, the second type circuit board 400-FT2 includes first substrate pads PDT1 respectively electrically connected to the first pads PD1, second substrate pads PDT2 respectively electrically connected to the fourth pads PD4, and first and second substrate signal lines SLT1 and SLT2. A first substrate signal line SLT1 electrically connects first pads PDT1-1 of the first substrate pads PDT1 to a second substrate pad PDT2-1 of the second substrate pads PDT2. A second substrate signal line SLT2 electrically connects second pads PDT1-2 of the first substrate pads PDT1 to another second substrate pad PDT2-2 of the second substrate pads PDT2. The first substrate signal line SLT1 electrically connects the first sensors RP of the first sensor row TSL1 each other. A second substrate signal line SLT2 electrically connects the first sensors RP of the second sensor row TSL2 each other.

Figure 20:
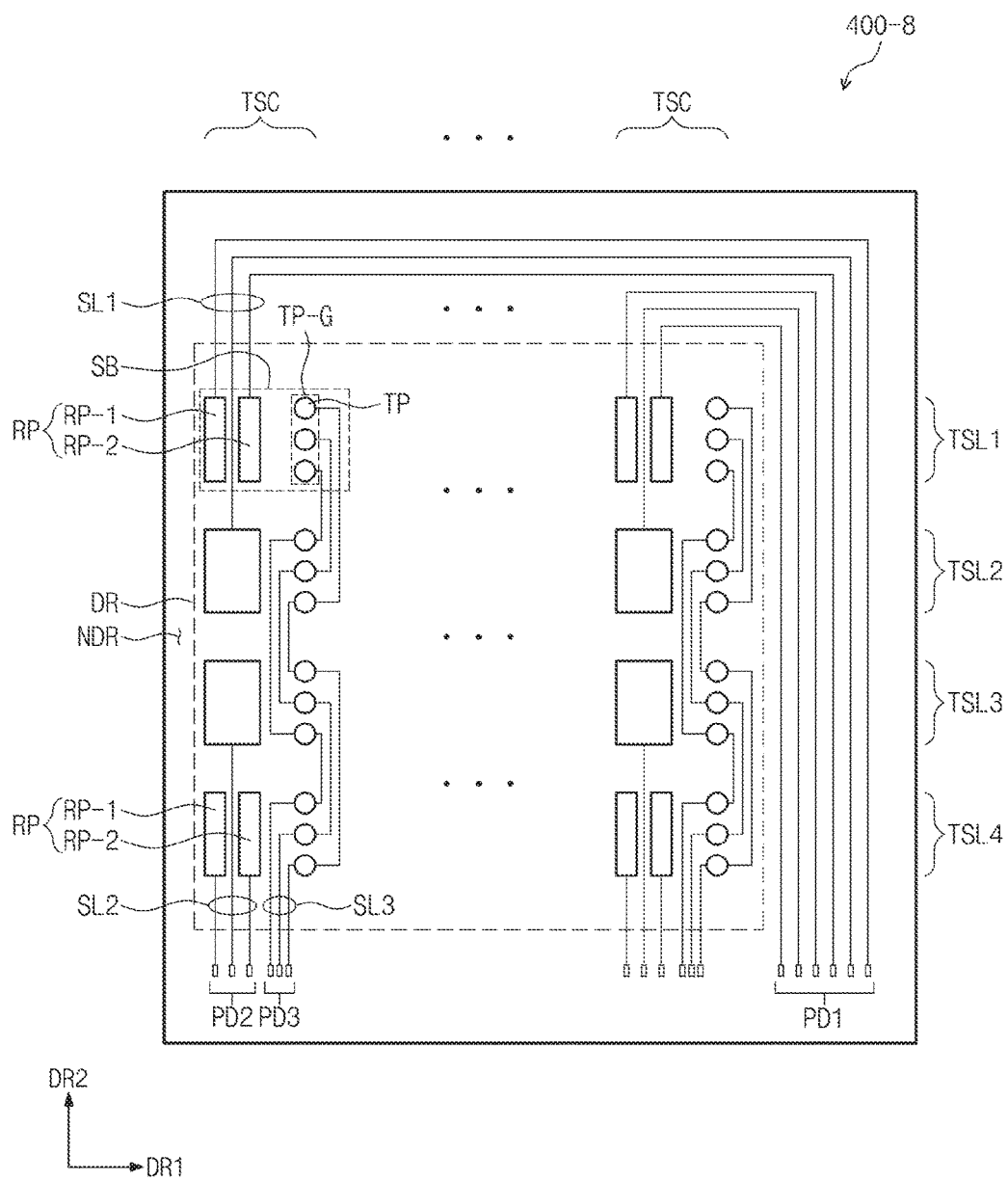
FIG. 20 is a plan view of a touch sensing unit, according to one or more exemplary embodiments.
Figure 21:
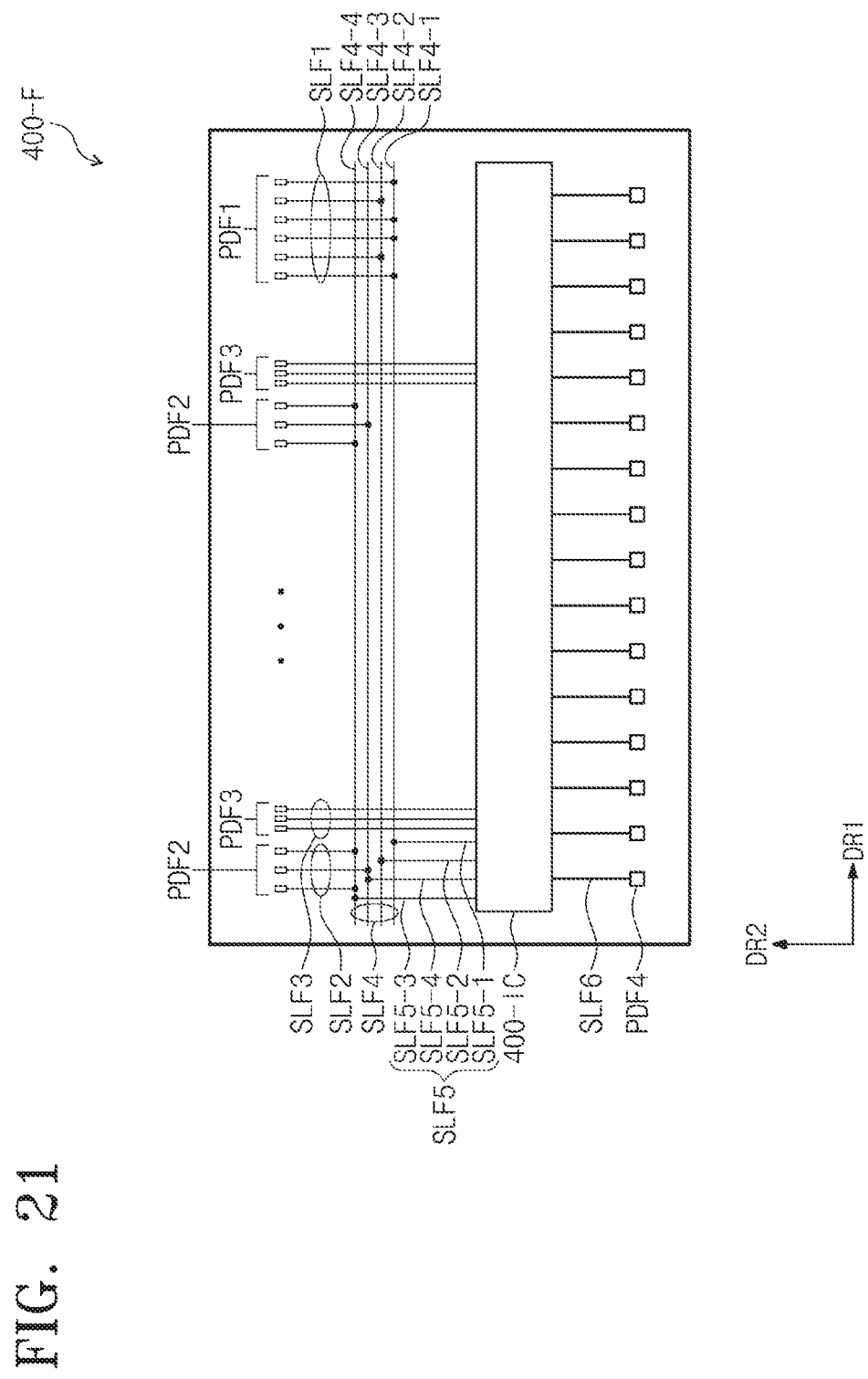
FIG. 21 is an enlarged plan view of a circuit board, according to one or more exemplary embodiments.
Figure 22:
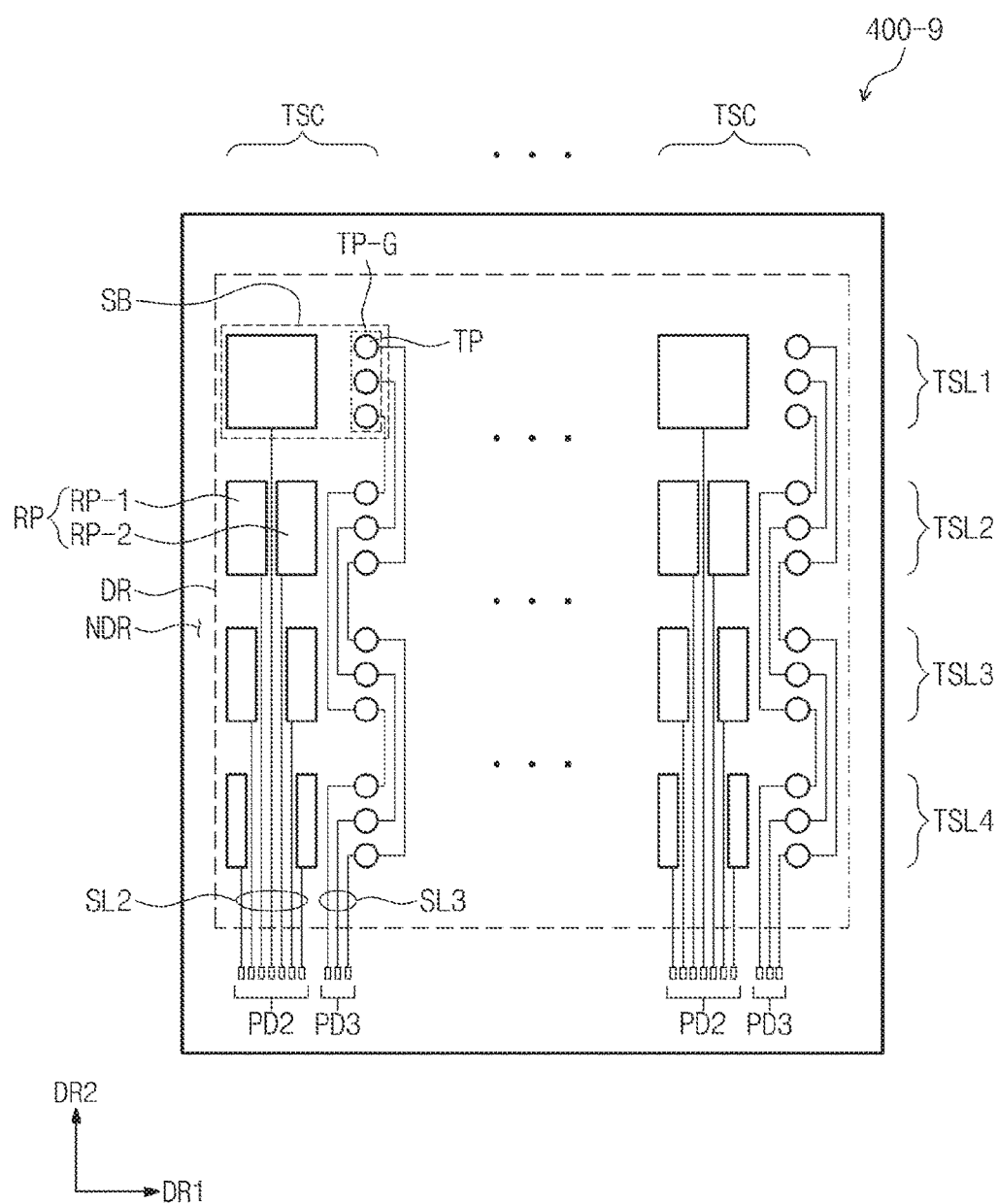
FIG. 22 is a plan view of a touch sensing unit, according to one or more exemplary embodiments.
Figure 23:
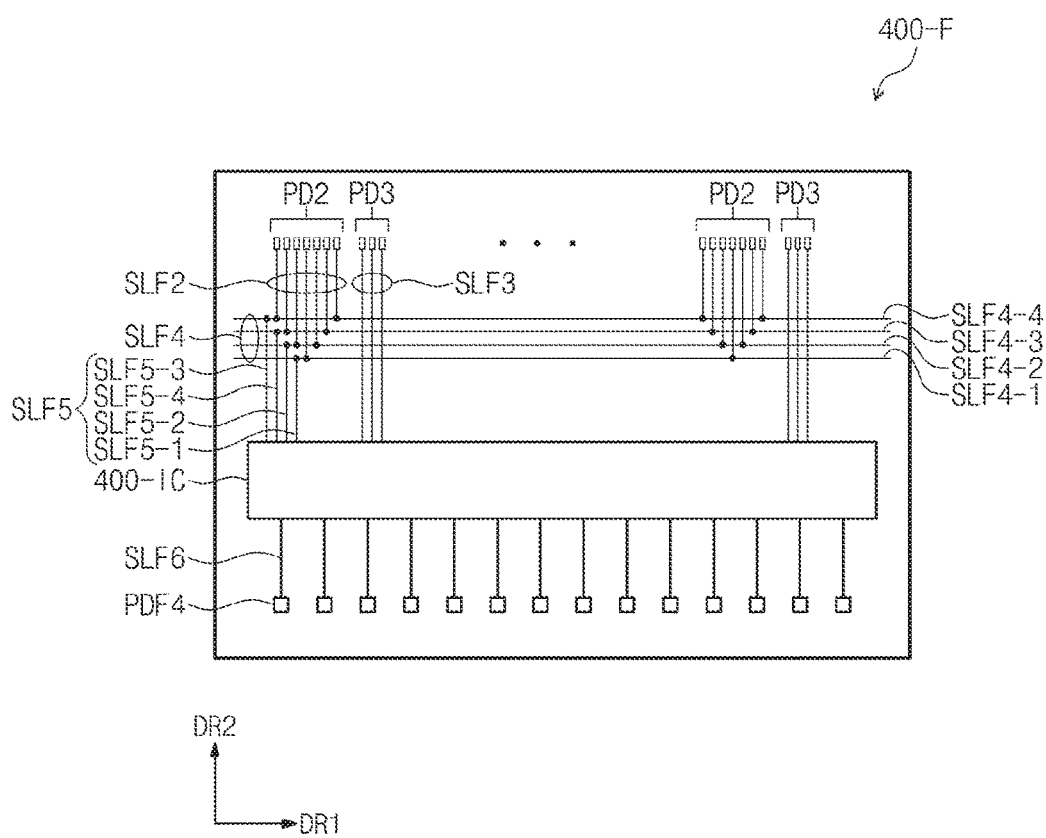
FIG. 23 is an enlarged plan view of a circuit board, according to one or more exemplary embodiments.

FIG. 20 is a plan view of a touch sensing unit, according to one or more exemplary embodiments. FIG. 21 is an enlarged plan view of a circuit board, according to one or more exemplary embodiments. FIG. 22 is a plan view of a touch sensing unit, according to one or more exemplary embodiments. FIG. 23 is an enlarged plan view of a circuit board, according to one or more exemplary embodiments. Hereinafter, the touch sensing units 400-8 and 400-9 will be described in more detail with reference to FIGS. 20 to 23. In FIGS. 20 to 23, detailed descriptions of the same elements as those in FIGS. 1 to 19 will be omitted to avoid redundancy and obscuring exemplary embodiments described herein.

Referring to FIG. 20, a portion of the first sensors RP includes a first sensor portion RP-1 and a second sensor portion RP-2 spaced apart from the first sensor portion RP-1. In accordance with a first sensor column TSC1, the first sensors RP of the first and fourth sensor blocks SB include two sensor portions RP-1 and RP-2. The two sensor portions RP-1 and RP-2 are spaced apart from each other in the first direction DR1. In this manner, a portion of the first signal line SL1 connected to the first sensor RP of the second sensor block SB is disposed between the first sensor portion RP-1 of the first sensor block SB and the second sensor portion RP-2 of the first sensor block SB. A portion of the second signal line SL2 connected to the first sensor RP of the third sensor block SB is disposed between the first sensor portion RP-1 of the fourth sensor block and the second sensor portion RP-2 of the fourth sensor block.

According to one or more exemplary embodiments, the first signal line SL1 connected to the first sensor RP of the second sensor block SB may not be disposed between the first sensor RP and the second sensors TP of the first sensor block SB. The second signal line SL2 connected to the first sensor RP of the third sensor block SB may not be disposed between the first sensor RP and the second sensors TP of the fourth sensor block. Since the number of signal lines disposed between the first sensor RP and the second sensors TP is reduced, noise exerting influence on the capacitance formed by the first sensor RP and the second sensors TP may be reduced.

The circuit board 400-F shown in FIG. 21 may have the same structure and function as those of the circuit board 400-F shown in FIG. 8 except for first substrate pads PDF1, first substrate signal lines SLF1, second substrate pads PDF2, and second substrate signal lines SLF2. That is, the number of each of the first substrate pads PDF1, the first substrate signal lines SLF1, the second substrate pads PDF2, and the second substrate signal lines SLF2 of the circuit board 400-F is increased.

As shown in FIG. 22, a portion of the first sensors RP includes a first sensor portion RP-1 and a second sensor portion RP-2 spaced apart from the first sensor portion RP-1. In accordance with the first sensor column TSC1, the first sensors RP of the second to fourth sensor blocks SB include two sensor portions RP-1 and RP-2. The two sensor portions RP-1 and RP-2 are spaced apart from each other in the first direction DR1. In this manner, the second signal line SL2 connected to the first sensor RP of the first sensor block SB is consecutively arranged between the first and second sensor portions RP-1 and RP-2 of the second to fourth sensor blocks SB. The second signal lines SL2 connected to the first and second sensor portions RP-1 and RP-2 of the second sensor block SB are consecutively arranged between the first and second sensor portions RP-1 and RP-2 of the third and fourth sensor blocks SB.

According to one or more exemplary embodiments, the first signal lines SL1 and the first pads PD1 shown in FIG. 7A are omitted. Since the number of the signal lines disposed between the first sensor RP and the second sensors TP is reduced, noise exerting influence on the capacitance formed between the first sensor RP and the second sensors TP may be reduced.

The circuit board 400-F shown in FIG. 23 does not include the first substrate pads PDF1 and the first substrate signal lines SLF1, which is different from the circuit board 400-F shown in FIG. 8. In addition, the number of the second substrate pads PDF2 and the second substrate signal lines SLF2 is increased. The circuit board 400-F shown in FIG. 23 may have the same structure and function as those of the circuit board 400-F of FIG. 8 except for the aforementioned differences.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device comprising:
   a display panel; and
   a touch sensing unit on the display panel, the touch sensing unit comprising touch signal lines and sensor columns comprising k (k being a natural number greater than or equal to three) sensor blocks arranged in a first direction,
   wherein each of the k sensor blocks comprises:
      a first sensor; and
      i (i being a natural number greater than or equal to three) second sensors arranged in the first direction,
   wherein the touch signal lines comprise:
      first signal lines respectively connected to the first sensors; and
      second signal lines comprising first portions and second portions spaced apart from the first portions,
   wherein the first portions connect a j-th (j being a natural number greater than or equal to one and less than or equal to i) second sensor of the i second sensors of an n-th (n being a natural number greater than or equal to one) sensor block of the k sensor blocks to an (i−j+1)-th second sensor of the i second sensors of an (n+1)-th sensor block of the k sensor blocks,
   wherein the second portions connect a j-th second sensor of the i second sensors of the (n+1)-th sensor block of the k sensors blocks to an (i−j+1)-th second sensor of the i second sensors of an (n+2)-th sensor block of the k sensor blocks,
   wherein the first portions are disposed at one side of the i second sensors of the n-th sensor block and the i second sensors of the (n+1)-th sensor block, and
   wherein the second portions are disposed at another one side of the i second sensors of the (n+1)-th sensor block and the i second sensors of the (n+2)-th sensor block, the one side being different from the another one side.

2. The display device of claim 1, wherein the first sensor, the i second sensors, and the touch signal lines are disposed on a same base surface.

3. The display device of claim 2, wherein:
   the display panel comprises:
      a substrate;
      a circuit layer disposed on the substrate;
      a display element layer electrically connected to the circuit layer; and
      an encapsulation layer encapsulating the display element layer; and
   the display panel provides the same base surface.

4. The display device of claim 3, wherein a surface of the encapsulation layer serves as the same base surface.

5. The display device of claim 3, wherein the display element layer comprises an organic light emitting diode.

6. The display device of claim 3, wherein the first sensor has a mesh structure.

7. The display device of claim 3, wherein the i second sensors have a mesh structure.

8. The display device of claim 3, wherein the first sensor and the i second sensors include the same material.

9. The display device of claim 1, further comprising:
   a window member comprising an input surface associated with the k sensor blocks, wherein the window member comprises:
      a first layer; and
      a black matrix partially overlapping the first layer.

10. The display device of claim 1, further comprising:
    a driving circuit electrically connected to the touch signal lines,
    wherein the driving circuit comprises:
       a scan driving circuit configured to apply transmission signals comprising different information from each other to one of the first sensor and the i second sensors; and
       a touch sensing circuit configured to determine coordinate information of an input position based on received signals from another one of the first sensor and the i second sensors.

11. The display device of claim 1, wherein:
    the touch sensing unit further comprises a dummy pattern disposed between the first sensor and the i second sensors; and
    the dummy pattern is floated.

12. The display device of claim 1, wherein:
    the k sensor blocks comprise:
       first group sensor blocks arranged from a center portion of the corresponding sensor column to the first end of the corresponding sensor column; and
       second group sensor blocks arranged from the center portion of the corresponding sensor column to the second end of the corresponding sensor column;
    the first group of sensor blocks comprise:
       a first sensor block adjacent to the center portion of the corresponding sensor column; and
       a second sensor block disposed between the first end of the corresponding sensor column and the first sensor block;
    the first sensor of the second sensor block comprises:
       a first sensor portion; and
       a second sensor portion spaced apart from the first sensor portion in a second direction crossing the first direction; and
    a first signal line of the first signal lines that is connected to the first sensor of the first sensor block is disposed between the first sensor portion and the second sensor portion.

13. The display device of claim 12, wherein a first signal line of the first signal lines that is connected to the first sensor of the second sensor block comprises:
    a first sub-signal line connected to the first sensor portion; and
    a second sub-signal line connected to the second sensor portion.

* * * * *